United States Patent [19]

Wiggins

[11] Patent Number: 4,880,101

[45] Date of Patent: Nov. 14, 1989

[54] PIECE LOCATING SYSTEM FOR PAINTING OR THE LIKE

[75] Inventor: Richard F. Wiggins, Fairfield, Conn.

[73] Assignee: The Boeing Company, Seattle, Wash.

[21] Appl. No.: 245,715

[22] Filed: Sep. 16, 1988

[51] Int. Cl.[4] .............................................. B65G 47/24

[52] U.S. Cl. .................................... 198/403; 198/410; 198/465.3; 198/502.2; 414/405; 414/766

[58] Field of Search ..................... 198/403, 410, 465.1, 198/465.2, 465.3, 502.2; 414/405, 758, 766, 771, 773; 118/500, 503

[56] References Cited

U.S. PATENT DOCUMENTS

| | | | |
|---|---|---|---|
| 1,711,250 | 4/1929 | Purinton . | |
| 2,370,698 | 3/1945 | Vaughn . | |
| 2,621,807 | 12/1952 | Rendich . | |
| 3,175,820 | 3/1965 | Schiler . | |
| 3,178,168 | 4/1965 | Abernethy . | |
| 3,181,858 | 5/1965 | Daniels . | |
| 3,395,439 | 8/1968 | Palesi et al. . | |
| 3,442,251 | 5/1969 | Perkel . | |
| 3,463,478 | 8/1969 | Hennessey . | |
| 3,559,980 | 2/1971 | Terai et al. . | |
| 3,902,512 | 9/1975 | Armstrong . | |
| 4,042,734 | 8/1977 | Wiggins . | |
| 4,093,064 | 6/1978 | Crane | 198/463.3 |
| 4,098,046 | 7/1978 | Papa . | |
| 4,108,105 | 8/1978 | Wiggins . | |
| 4,121,817 | 10/1978 | Pavlovsky . | |
| 4,129,092 | 12/1978 | Wiggins . | |
| 4,220,430 | 9/1980 | Meiser et al. . | |
| 4,295,776 | 10/1981 | Payne et al. . | |
| 4,493,269 | 11/1984 | Down . | |
| 4,572,850 | 2/1986 | Bailey . | |
| 4,773,816 | 9/1988 | Fuller, Jr. et al. | 414/771 |

FOREIGN PATENT DOCUMENTS

| | | | |
|---|---|---|---|
| 2307628 | 11/1976 | France | 198/403 |
| 0019217 | 2/1982 | Japan | 198/403 |
| 0581053 | 11/1977 | U.S.S.R. | 198/403 |

*Primary Examiner*—Robert J. Spar
*Assistant Examiner*—D. Glenn Dayoan
*Attorney, Agent, or Firm*—Hughes & Multer

[57] ABSTRACT

An automated painting system where the parts to be painted are placed on a carrying tray in a first position and moved through a painting and a drying station so that first surface portions of the parts are painted. Then the carrying tray with the parts is moved first through a depth gauge unit and then to an inverting location to cause the parts to be deposited back on the same carrying tray but in an inverted position, this being accomplished by the use of two transfer trays and three inversion steps. Thereafter the parts on the carrying tray are again moved through the painting and drying stations and then discharged from the system.

38 Claims, 20 Drawing Sheets

PIECE LOCATING SYSTEM FOR PAINTING OR THE LIKE

TECHNICAL FIELD

The present invention relates to an apparatus and method for locating an objects(s) or workpiece(s) in the performance of an operation on the object(s) or workpiece(s) such as a surface operation (e.g., painting). More particularly, the present invention relates to an automated system for moving such object(s) or workpiece(s) through one or more operating stations such as in a painting system or the like, and inverting the object(s) or workpiece(s) during the operation.

BACKGROUND OF THE INVENTION

One method of performing a surface operation on an object (e.g., painting) is to place the object on a support platform so that the surface portion is exposed, performing the surface operation, and then moving the object to a different position on the platform to expose another surface portion and then repeating the surface operation. This can be a time consuming operation particularly where a large number of parts are involved. Accordingly, it would be desirable to automate such a system as much as possible, and in particular to automate the operation of moving and positioning of the object(s) so as to properly expose the various surface portions of the object(s) or workpiece(s).

Another consideration in a manner so that the particular workpieces can be identified before and after the surface operation. For example, in an industry such as the aircraft industry, for purposes of quality control it is desirable in some instances to identify the origin of the particular part throughout its manufacture, painting, etc. If identification is applied directly to the part itself, this may impair the ability to paint the exposed surface areas completely. This problem can be alleviated by maintaining identification of the particular tray or support platform on which the part is carried through the automated system, but this would of course necessitate that the workpiece remain associated with the same tray.

Another consideration is that the system should be arranged so that it does not demand constant attention of an operator or overseer. For example, if human input or activity is required in the system, it would be desirable that such input would not require constant attendance or activity of the person throughout the operation.

A search of the patent literature in connection with U.S. Pat. application Ser. No. 761,980, entitled "Apparatus and Methods for Engaging a Workpiece", filed Aug. 2, 1985 by Fuller et al now U.S. Pat. No. 4,773,816, disclosed a number of U.S. patents, and other U.S. patents were developed during the prosecution of that application. These are listed below, in addition to other patents which have come to the attention of the applicant.

In U.S. Pat. No. 4,121,817 (Pavlovsky) there is disclosed an apparatus for engaging an irregularly shaped workpiece including a lower support plate having holes therein arranged to receive vertical support members of various heights to support a workpiece for retention thereof in a fixed relationship with a support plate by an upper opposing clamp.

In U.S. Pat. No. 3,463,478 (Hennessey) there is disclosed an apparatus for supporting a workpiece in a selected position including a base having openings for receiving pins therein which support the workpiece at a desired orientation relative to the base.

In U.S. Pat. No. 4,098,046 (Papa) there is disclosed a guide frame for the retention of slideable articles wherein the guide frame includes a top and bottom members each having opposing cantilevered ribs terminating in opposing parallel spaced apart bars which form top and bottom channels for receiving and engaging the article therein.

In U.S. Pat. No. 2,621,807 (Rendich) there is disclosed an apparatus for position and retaining display devices including a base member having spaced apart openings therein for receiving support members at predetermined locations to engage and accurately position a display device on the base.

In U.S. Pat. No. 3,559,980 (Terai et al) there is disclosed a system for adjusting the position of a plurality of jigs for supporting several workpieces in proximate relationship prior to welding the workpieces together wherein the controller moves the jigs vertically to form a support conforming to the shape of the workpiece for receiving the workpiece thereon.

In U.S. Pat. No. 3,175,820 (Schlier) there is disclosed a rotary table for rotatably supporting workpieces thereon wherein threaded support elements are vertically adjusted relative to the table to receive and support the workpiece thereon.

In U.S. Pat. No. 3,178,168 (Abernathy) there is disclosed an apparatus for positioning and supporting a container including a base having receptacles therein for receiving and supporting upright dowels to receive an inverted box thereon in order to perform operations on the box.

In U.S. Pat. No. 3,181,858 (Daniels) there is disclosed a support for a workpiece including a plurality of yielding members which are resiliently biased to a vertical position, but which yield to a portion of the workpiece extending below the plane thereof when the workpiece slides across the top of the support, and then which return to an erect position.

In U.S. Pat. No. 3,442,251 (Perkel) there is disclosed an apparatus for coating articles including a container having a rotary shaft supporting opposing adjustable arm members forming a grid structure for engaging the articles therebetween, and a sprayer assembly for applying a solution to the article as it is rotated in the container.

U.S. Pat. No. 2,370,698 (Vaughn) shows a device for quickly turning over small objects, with these objects being supported on wire mesh screens. This screen, with the objects being positioned thereon, is placed on a sponge rubber surface that is in turn mounted to a pivotally mounted plate. There is a second plate, pivotally mounted to the first plate and also having a wire mesh screen backed by sponge rubber. The second plate is pivoted upwardly and downwardly so that the second screen engages the objects on the first screen. Then the two plates together, holding the objects secured between the two screens and the sponge rubber members, are rotated 180% so that the objects come to rest on the second screen.

U.S. Pat. No. 4,295,776 (Payne et al) discloses a device for transferring bulk goods between pallets. A first pallet having the bulk goods thereon is placed on a floor of the inverting member and a lid is moved to clamp a second pallet on the opposite side of the load. The inverter is then rotated to cause the load to rest on the second pallet.

U.S. Pat. No. 1,711,250 (Purinton) shows a process and apparatus by which two sides of objects, such as buttons, can be painted. The buttons are loaded from a hopper onto an assembling tray 13 which has recesses shaped to receive the buttons with the concave middle face facing downwardly, but to reject the buttons which are inverted. Then a screen is placed on the buttons on the assembly tray, with the assembly then being inverted so that the buttons come to rest on the screen with their concave side facing upwardly. Then the concave facing surface of the buttons can be painted, such as by spray painting. The buttons are then moved off the tray to a collecting location. To paint the other side of the buttons, the buttons (with their concave sides painted) are again placed on an assembling tray, with the assembling tray being vibrated to cause the buttons to fall into the proper recesses. Then a second inverting tray, having recesses complementary to the assembly tray, is placed on top of the buttons. The two trays are then inverted, so that the buttons now lay on the reversing tray with the painted concave surfaces facing upwardly. A screen is then placed on the reversing tray, and both of these are inverted so that the buttons come to rest on the screen with the unpainted convex surfaces facing upwardly. These convex surfaces can then be painted.

U.S. Pat. No. 3,395,439 (Palesi et al) shows an apparatus for mounting electrical components having lead wires. A cover with a resilient pad is brought into engagement with the electrical components with the pad clamping the components against the board. The apparatus with the components clamped to the circuit board may then be inverted for joining the lead wires to the conductive circuit of the circuit board.

U.S. Pat. No. 3,902,512 (Armstrong et al) shows a washer using a vibrating feed element having bristles, with the vibrating movement causing the articles to be washed to be moved through the washer.

U.S. Pat. No. 4,572,850 (Bailey) shows an apparatus for supporting objects of various shapes for submergence in a liquid. There is a pair of sheets of elastomeric material which engage the object to hold it in place.

U.S. Pat. No. 4,483,269 (Down) shows a fixture for holding flexible printed circuit board substrates by means of screens of a wire mesh material.

U.S. Pat. No. 4,108,105 (Wiggins) shows a part gauging control system for a liquid spray apparatus. There is a laterally movable plate 17 which is moved into engagement with a workpiece which is about to enter the painting chamber. The position of the plate 17 as it engages the workpiece is relayed to circuitry which in turn determines the position of the spray head means in the painting chamber. Also, the exit doors are opened in accordance with the dimensions of the workpiece.

U.S. Pat. No. 4,042,734 (Wiggins) discloses a method and apparatus for spray coating where there is a plurality of atomizing nozzles. The article to be painted is conveyed past the spray station and the spray head or heads are moved along a particular path to accomplish proper painting.

U.S. Pat. No. 4,129,092 (Wiggins) discloses substantially the same subject matter as U.S. Pat. No. 4,042,734.

U.S. Pat. No. 4,220,430 (Meleer et al) shows a device for positioning a movable part of a machine tool, such as positioning a spindle relative to a housing. There is a transmitter connected to one part and a differential transmitter secured to the other part. First and second heads are positioned relative to first and second transmitter surfaces so that the heads produce a control signal in accordance with the amount of the head aligned with the surfaces. Control means are connected to the respective heads for moving the machine part to the appropriate location.

SUMMARY OF THE INVENTION

The present invention comprises a system, method and apparatus for locating an object(s) or workpiece(s) in the performance of an operation on the object(s) or workpiece(s) such as a surface operation (e.g., painting). More specifically, the present invention relates to an automated system for moving such object(s) through one or more operating stations such as in a painting system or the like, and inverting the object(s) during the operation, and relates to components of the system, method and apparatus.

In the method of the present invention, the object is located on a carrying tray means in a first position so as to orient the object in a first manner and performing a first processing step on the object. Then a first transfer tray means is located against the object so as to hold the object against the carrying tray means. The carrying tray means and the first transfer tray means are inverted so that the object rests on the first transfer tray means.

Then a second transfer tray means is located against the object so as to hold the object against the first transfer tray means. The first and second transfer tray means are inverted so that the object rests on the second transfer tray means. The carrying tray means is then located against the object so as to hold the object against the second transfer tray means.

The carrying tray means and the second transfer tray means are inverted so that the object rests on the carrying tray means in a second inverted position and then a second processing step is performed on the object.

In a preferred form, the first transfer tray means and the carrying tray means are inverted at a first inverting location, after which the transfer tray means is moved to a second inverting location where the second transfer tray means engages the object and said first and second transfer tray means are inverted.

Further, in the preferred form, after the object is transferred onto the second transfer tray means by inversion of the first and second transfer tray means, the second transfer tray means is moved to the first inverting location, where the second transfer tray means and the carrying tray means are inverted to locate the object on the carrying tray means.

Further, in the preferred form, the carrying tray means with the object thereon is moved by first inverting conveyor means in a longitudinal direction to the first inverting location, and after inverting the carrying tray means in said first transfer tray means, said first transfer tray means is moved by second inverting conveyor means in a transverse direction to the second inverting location. Further, the second transfer tray means is moved by third inverting conveyor means back to the first inverting location where the carrying tray means and second transfer tray means are inverted, and the carrying tray means is moved by the first inverting conveyor means longitudinally from the first inverting location.

Also, in the preferred form, prior to locating the first transfer tray means against the object, the carrying tray means with the object thereon is located at a gauging location. A depth gauging means is located adjacent to said object to ascertain a depth dimension of said object relative to said carrying tray means, and the first and second transfer tray means and the carrying tray means are subsequently located at an appropriate depth location relative to said object in accordance with the depth dimension as ascertained by said depth gauging means.

In a preferred embodiment, the gauging means comprises a depth gauging plate which is moved downwardly into contact with the object to ascertain the depth dimension. More specifically, the depth gauging plate means is carried by a gauging frame means, and the carrying tray means and the gauging frame means are moved relatively toward one another to cause said gauging plate means to come into contact with the object to cause limited relative movement between the gauging plate means and the gauging frame means, with the relative movement being ascertained to in turn ascertain the depth dimension of the object.

As a more specific feature, there is provided rotatable gauging screw drive means in operative working engagement between the carrying tray means and the gauging frame means. Relative movement of the gauging frame means and said carrying tray means toward one another is accomplished by rotation of the gauging screw drive means, with the depth dimension being ascertained by ascertaining amount of rotation of the gauging screw drive means.

As a further specific feature, there is provided inverting screw drive means to locate the first and second transfer tray means against the object, with rotation of the inverting screw drive means being in response to the amount of rotation of said gauging screw drive means in a manner that movement of at least the first and second transfer tray means against the object is controlled in response to amount of rotation of the gauging screw drive means.

Also in the method of the present invention, the carrying tray means is moved from a first process location to a second process location by moving the carrying tray means by means of a first transporting conveyor means in a first conveying direction to a transfer location. Then there is utilized a conveyor transfer means located at said transfer location to support said carrying tray means at a first elevation at the transfer location. The conveyor transfer means is moved vertically to a second elevation to bring said carrying transfer tray means to a position for engagement with a second transporting conveyor means.

The second transporting conveyor means is operated to move the carrying tray means from the transfer location in a second conveying direction having a substantial alignment component transverse to the first conveying direction. The method is further characterized in that the conveyor transfer means is utilized to move the carrying tray means generally horizontally relative to the transfer location.

In a first arrangement, the conveyor transfer means comprises a transfer conveyor having a conveying motion aligned along said first conveying direction. The method further comprises lowering the conveyor transfer means after the carrying tray means is located at the transfer location to cause the carrying tray means to be positioned on a first end of the second transporting conveyor means. In another arrangement, the conveying motion of the transfer conveyor is aligned along said second conveying direction. In this circumstance, the conveyor transfer means is raised after the carrying tray means is located at the transfer location to cause the carrying tray means to be positioned at said second elevation, after which the second transporting conveyor means moves the carrying tray means.

Desirably, the carrying tray means has an angular orientation relative to the first and second conveying directions, and the carrying tray means maintains this angular orientation during movement to the transfer location and from the transfer location.

In the preferred form, the transfer conveyor means within which the conveyor transfer means is located comprises laterally spaced first and second conveying chain means adapted to engage first and second edge portions of the carrying tray means. The conveyor transfer means is located between the first and second conveying chain means.

Also, in a preferred form, at least one of the first and second transporting conveyor means comprises laterally spaced conveying chain means. The carrying tray means is formed with downwardly facing open channel means to receive the first and second conveying chain means. The first and second conveying chain means are operated to carrying the carrying tray means with the first and second conveying chain means engaging the channel means so as to properly align and engage the carrying tray means.

In the system of the present invention, there is a transporting conveying apparatus to move a carrying tray means between process locations.

There is a first inverting section comprising:

a. a first lower support frame means positioned to receive thereon from said transporting conveying apparatus the carrying tray means at a first inverting location;

b. a second upper support frame means adapted to carry a first transfer tray means at the first inverting location;

c. a first vertical actuating means operatively connected between the first lower and upper frame means to move at least one of said first lower and upper frame means in relative motion toward and away from one another; and d. a first rotatable actuating means operatively connected to said first lower and upper frame means and arranged to cause rotation of said first lower and upper frame means to invert said first upper and lower frame means and thus invert said carrying tray means and said first transfer tray means.

There is also a second inverting section comprising second lower support frame means, second upper support frame means, second vertical actuating means and second rotatable actuating means, arranged similarly to the corresponding first lower support frame means, first upper support frame means, first vertical actuating means, and first rotatable actuating means.

There is further provided means to move the first and second transfer tray means between said first and second inverting locations. Thus, the first transfer tray means can be moved from said first upper transport frame means at a lower location to said second lower support frame means at a lower location, and said second transfer tray means can be moved from said second upper transport frame means at a lower location to said first upper support frame means at a lower location. The result is that an object initially on said carrying tray means can be moved between said first and second inverting locations and deposited from said second inverting location to said first inverting location to come to rest on said carrying tray means in an inverted position.

In a preferred form, the inverting conveying means comprises a first lower inverting conveyor positioned adjacent to the first inverting location and arranged to move the carrying tray means in a longitudinal direction to the first lower inverting location, and a first upper inverting conveyor at said inverting location adjacent said first upper transfer frame means and arranged to convey the first transfer tray means along a transverse axis laterally from the longitudinal axis to the second inverting location.

There is also a second upper conveyor positioned adjacent to said second upper support frame means and arranged to move the second transfer tray means along said transverse axis from the second inverting location to the first inverting location. Further, the inverting means comprises a second lower conveyor arranged to move the first transfer tray means along the transverse axis from the second inverting location to the first inverting location.

In a more specific form, the first rotatable actuating means comprises a first main frame mounted for rotation about a transverse horizontal axis, and the first and second support frame means are mounted to said first main frame, with at least one of the upper and lower support frame means being vertically movable relative to the first main frame. As a further specific feature, there is inverting screw drive means mounted to the first main frame and operatively connected to at least one of the first upper and lower support frame means, in a manner that rotation of the inverting screw drive means causes vertical movement of at least one of the first upper and lower support frame means relative to the first main frame. In a more specific form, there is vertical movement of both of said upper and lower support frame means relative to the main frame. Also, in the preferred form, the second inverting section is structured similarly to the first inverting section as described above.

There is also a gauging apparatus which comprises a gauging conveyor and support means adapted to move the carrying tray means with the object thereon to a gauging location and to support the carrying tray means at the gauging location. There is gauging frame means mounted so as to be vertically movable toward and away from the gauging conveying and support means at the gauging location. This gauging plate means is mounted to the gauging frame means and arranged to come into engagement with the object so as to ascertain a depth dimension of the object on the carrying tray means. Control means is provided between the gauging apparatus in the first and second inverting sections to control the first and second vertical actuating means in accordance with the depth dimension of the object as ascertained by the gauging apparatus. There are other specific features of the gauging apparatus enclosed.

Further, the transporting conveyor apparatus comprises the first and second transporting conveyors and also the conveyor transfer means as described above.

Other features will become apparent from the following detailed description.

DESCRIPTION OF THE PREFERRED EMBODIMENT (a) The Overall System

Figure 1:
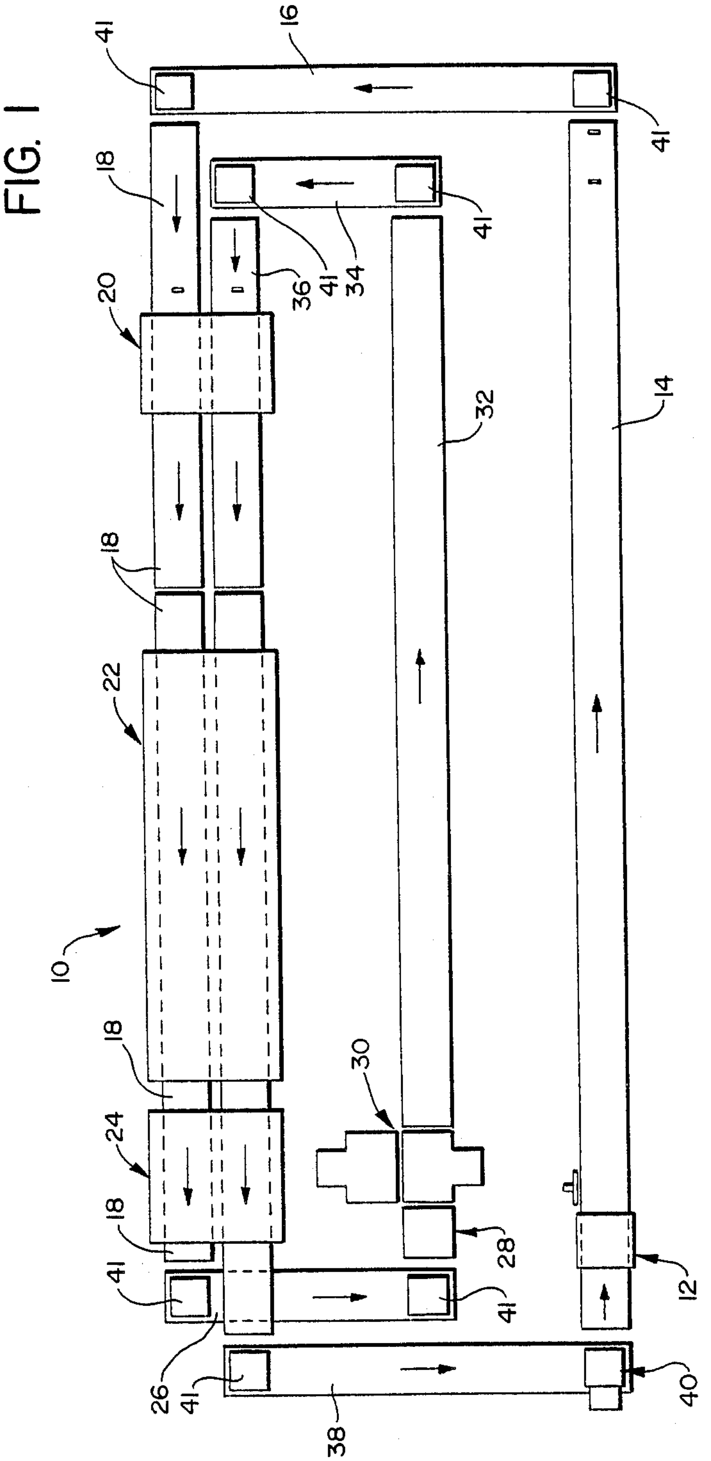
FIG. 1 is a semi-schematic, top plan view of an automated painting system incorporating the present invention.
Figure 2:
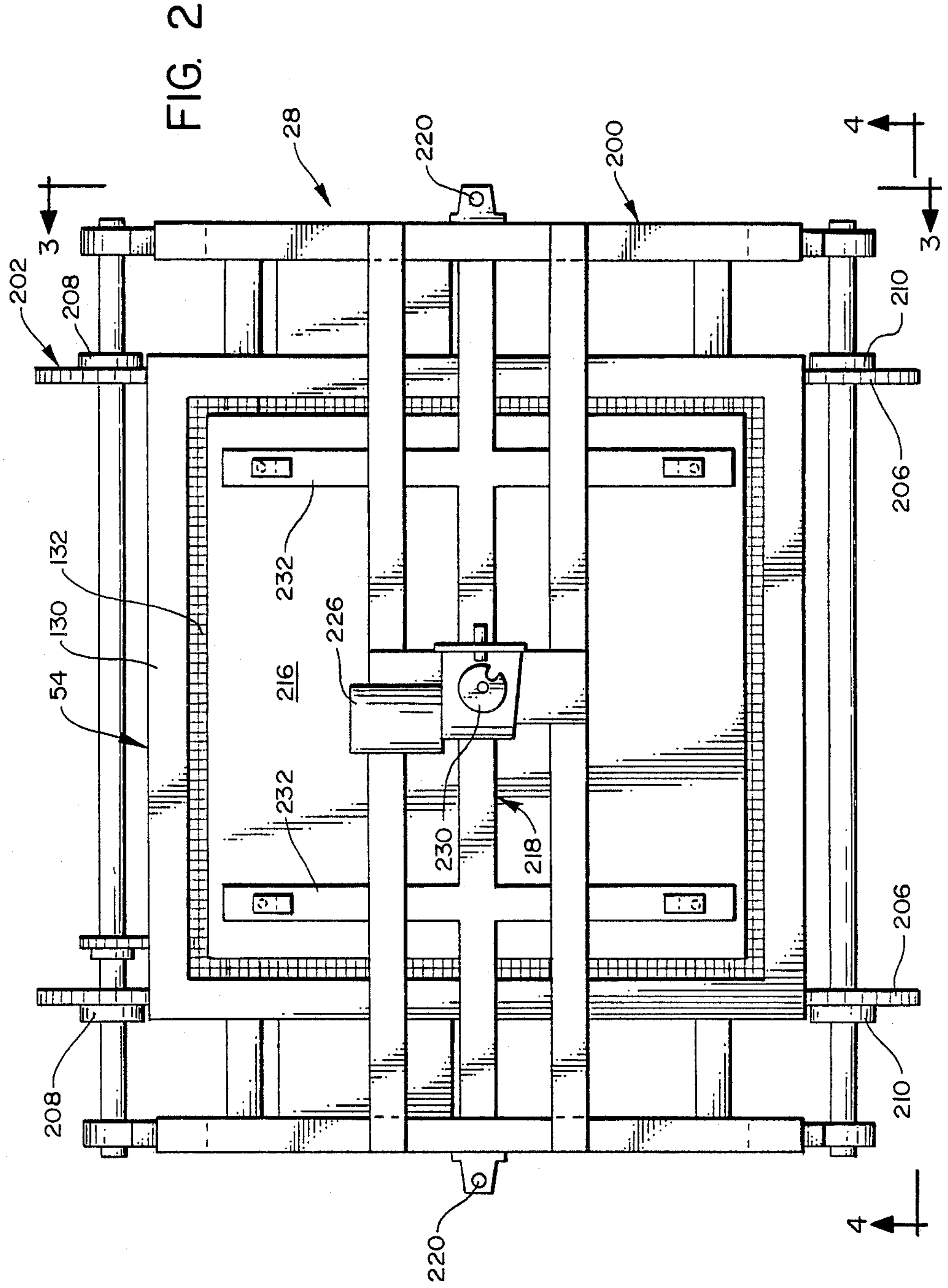
FIG. 2 is a top plan view of a gauging unit associated with the present invention.

The overall system of the present invention is shown somewhat schematically in the top plan view of FIG. 1. This system 10 has a loading station 12 at which carrying trays have workpieces or objects are placed to be moved through the automated painting system of the present invention. These trays are each placed on a first conveyor 14 to be carried to a second conveyor 16, and then to a third conveyor 18 which moves each tray with the workpieces thereon first through a painting station 20, through a preliminary drying and drying station 22, and then through a cooling station 24. As each tray leaves the cooling station 24, it is carried by a transferer conveyor 26 to be moved into a gauging unit 28. This gauging unit 28 ascertains the height of the workpiece or workpieces on each tray and transmits this information to an inverting unit 30.

This inverting unit 30 is particularly critical in the system of the present invention, and its main function is to move the workpieces which have been painted on one side and possibly on other surface areas, to an inverted position so that the remaining surface portions of these workpieces can be painted as the tray with the workpieces thereon moves again through the painting, drying and cooling stations. This is done in a manner that the workpiece or workpieces remain on the same tray on which they were originally placed at the loading station 12. The operation of this inverting unit 30 will be described in more detail later herein.

Each tray that leaves the inverting unit 30 is carried by conveyors 32 and 34 to a conveyor 36 by which the tray is then moved through the painting station 20, drying station 22, and cooling station 24 to complete the painting operation on those particular workpieces. The tray, after completing its second pass through the cooling station 24, moves onto another transfer conveyor 38 to be moved to a discharge location 40.

At the discharge location 40, there is an automatic discharge mechanism which lifts the tray and tips it to unload the workpieces. Then the tray travels toward the loading station where an automatic tray stacking device engages the tray to lift it to a stacked location from which the tray can be extracted and be loaded with an additional workpiece or workpieces to be again moved through the system.

Also at each location where a tray is being transferred from a first conveyor traveling in a first direction onto a second conveyor which is traveling laterally from the direction of the first conveyor, there is utilized a conveyor transfer assembly, generally designated 41, to accomplish the movement of the tray from one conveyor to another. In the particular embodiment of the system shown herein, such transfer assemblies 41 are provided at seven different locations.

As indicated previously, one of the significant aspects of the present invention is the construction and operation of the inverting unit 30. It is believed that a better overall appreciation of the system of the present invention will be obtained by first discussing the broad functional features of the inverting unit 30, and following this by more detailed descriptions of other aspects of the system of the present invention.

(b) General Description of the Operation of the Inverting Unit 30

This initial description of the inverting unit 30 will be done with reference to FIGS. 12A through 12L. The inverting unit 30 comprises first and second inverting sections 42 and 44 respectively. The main components of these two section 42 and 44 are quite similar to one another, and accordingly, like numberical designations will be given to the corresponding components of the two sections, with an "a" suffix distinguishing those of the first section, and a "b" suffix distinguishing those of the second section.

Figure 12A:
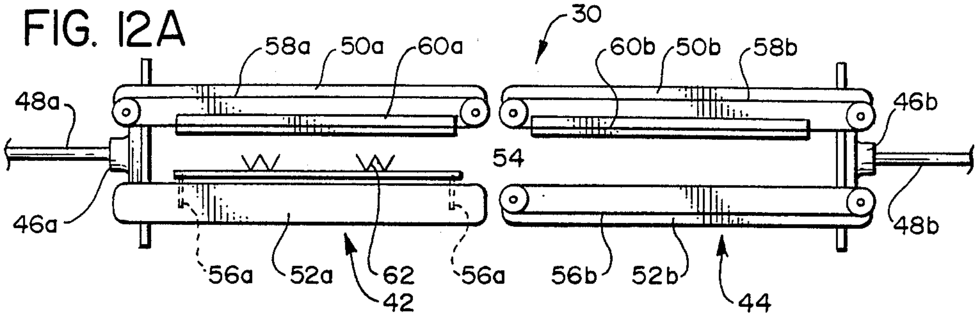
FIGS. 12A through 12L are semi-schematic side elevational views of the inverting unit of the present invention, showing in successive views the various operating stages of the inverting unit.

The terms "upper" and "lower" will be used to describe the relative vertical locations of these components. However, it is to be understood that components of these two inverting sections 42 and 44 rotate 180° about horizontal axes at various times during the inverting operation, and thus for a portion of the time the components which were previously "upper" become positioned for a period of time at a "lower" location. Thus, these terms "upper" and "lower" will be used to relate to those components which at the start of the operation, as shown in FIG. 12A, are at an "upper" or "lower" location. The "upper" components will continue to be designated "upper" components even during those portions of the description when they become positioned at a lower location. Similarly, the "lower" components will retain the "lower" designation throughout the description even when they become positioned at an upper location.

The first inverting section 42 comprises a rotatable main frame **46*a* which is rotated about a transverse horizontal axis by means of a shaft 48*a*. Mounted to the rotatable main frame 46*a* are upper and lower tray support frames 50*a* and 52*a*, respectively. These two frames 50*a* and 52*a*** are arranged for limited vertical movement toward and away from one another.

The lower tray support frame **52*a* is positioned at about the same horizontal level, and in alignment with, the conveyor 32 which carries each tray away from the inverting unit 30, and also positioned so as to receive each of the carrying trays from the gauging unit 28. A single carrying tray 54 is shown in FIG. 12A positioned on a lower transfer conveyor 56*a* which is mounted to the lower support frame 52*a*. This transfer conveyor 56*a* functions to move the carrying tray 54 forwardly from the gauging unit 28 onto the lower support frame 52*a*, and then after the inverting operation to move the tray 54 forwardly onto the conveyor 32 for further painting. Thus, as indicated above, the transfer conveyor 56*a* is longitudinally aligned relative to the conveyor 32. It is to be understood that this transfer conveyor 56*a* is shown somewhat schematically in FIG. 12A and appears here as only two sprocket wheels carrying two conveyor chains located at opposite side edges of the tray 54**, but will be described more fully later herein.

Figure 12B:
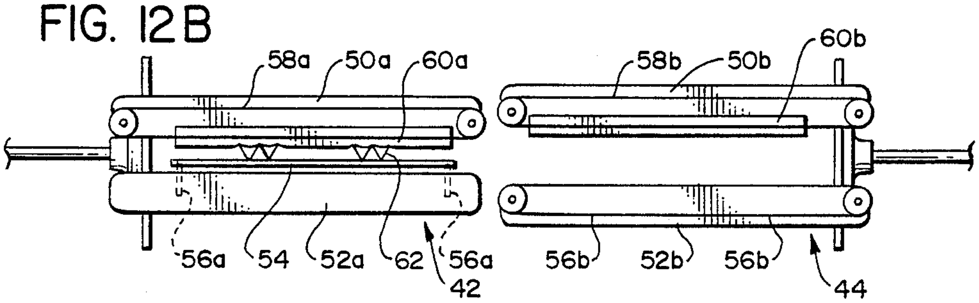
Figure 12C:
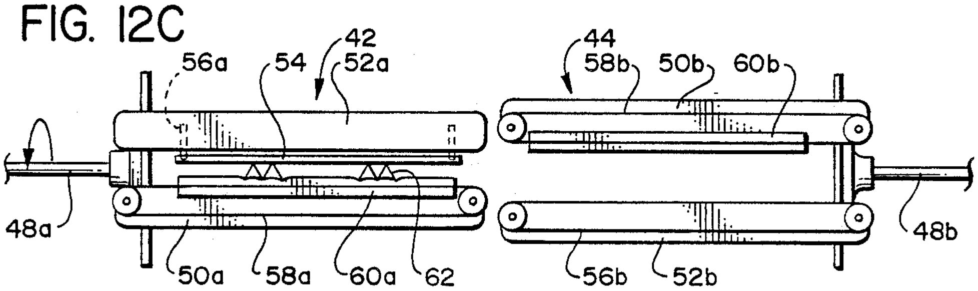
Figure 12D:
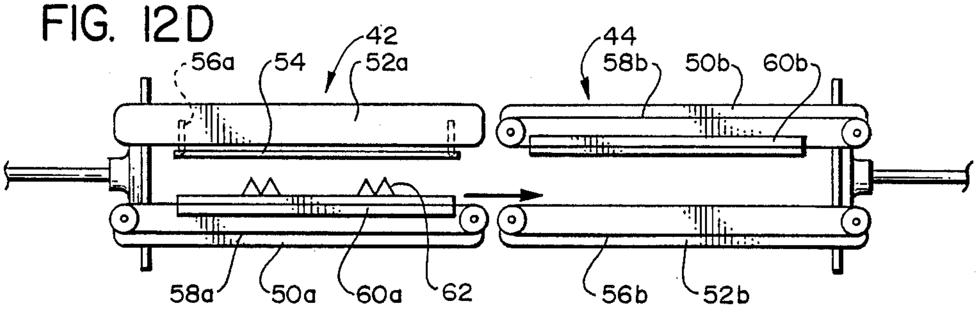
Figure 12E:
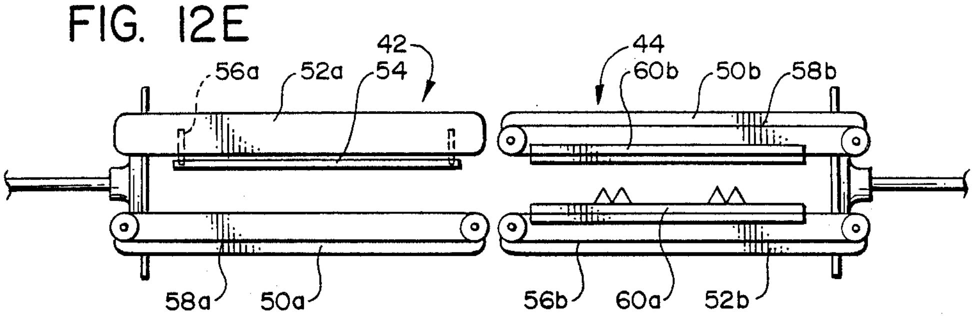

The upper support frame **50*a* has mounted thereto an upper transfer conveyor 58*a* which functions to move a transfer tray 60*a* (also called a "host tray" 60*a*) laterally to the right inverting section 44, as illustrated in FIG. 12D. This upper conveyor is transversely aligned so that its axis of travel is at right angles to that of the lower transfer conveyor 56*a*. As will be described more fully hereinafter, there are two transfer trays 60*a* and 60*b*, and each of these has a workpiece engaging surface provided by a yielding material so as to enable the transfer tray to yieldingly engage the workpieces which are to be painted further, and hold these securely against the carrying tray 54 or against the other transfer tray 60*b* or 60*a***. The yielding material may have a number of protrusions and indentations formed along the surface. Also, the yielding material can be formed with a plurality of flexible fingers to accomplish the proper yielding engagement.

As indicated above, the second inverting section 44 is substantially similar to the first inverting section 42, and rather than describe the corresponding components, these are simply given their corresponding numerical designations in the drawings, with the "b" suffix added thereto. An essential difference is that the lower transfer conveyor **56*b* of the second section 44 is transversely aligned, in contrast to the lower conveyor 56*a* of the first section 42 which is longitudinally aligned. The reason for all this will become apparent as we proceed through the operation of the inverting section 30, while following the FIGS. 12A through 12L**.

To proceed now with the description of the operation of this inverting unit 30, let it be assumed that there are a number of workpieces (two of which are indicated at 62 in FIG. 12A) which have previously been placed on the tray 54 and have moved once though the painting, drying and cooling sections 20–24 so that at least part of the exposed surfaces of those workpieces 62 have been painted. It is now desired to invert these two workpieces 62 so that the remaining surface portions can be painted, and yet accomplish this in a manner so that these workpieces 62 remain on the same tray 54. (As indicated previously, this would enable proper identification of the workpieces 62 by the continued association with the same tray, which could be numbered or otherwise identified.)

Another consideration is that by utilizing the separate transfer trays 60a and 60b which do not carry the workpieces 62 through the operation, the transfer trays 60a and 60b can be specifically designed to best accomplish the inverting and transfer operations to hold the workpieces securely. Further, the carrying trays 54 can have their design optimized so as to enable the workpieces 62 to be properly processed at other locations in the system.

In FIG. 12A the tray 54, with workpieces 62 thereon, is shown positioned on the lower transfer conveyor 56a which in turn is mounted to the lower support frame 52a. The first step, as shown in FIG. 12B, is to move the upper and lower support frames 50a and 52a toward one another so that the transfer tray 60a engages the two workpieces 62 in a manner to hold these securely against the lower carrying tray 54. Then, as shown in FIG. 12C, the shaft 48a is rotated 180° so that the transfer tray 60a now becomes positioned at a lower position, while the carrying tray 54 becomes positioned at an upper position. Then, as shown in FIG. 12D, the upper and lower frames 50a and 52a (which are now in an inverted position) are moved away from one another. After this, the carrying tray 54 is moved by the upper transfer conveyor 58a (which is now at a lower position) to the right (as seen in FIG. 12D) onto the lower transfer conveyor 56b mounted to the lower support frame 52b of the inverting section 44 (this being shown in FIG. 12E).

Figure 12F:
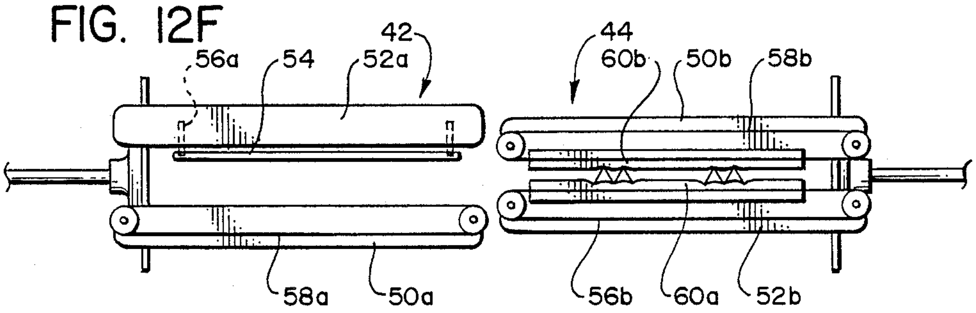
Figure 12G:
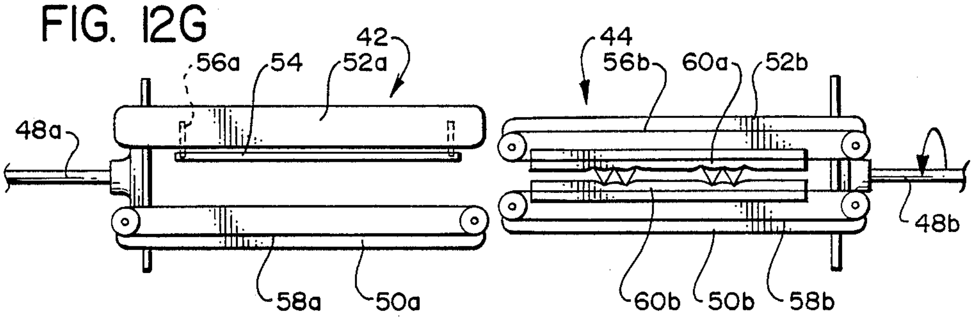
Figure 12H:
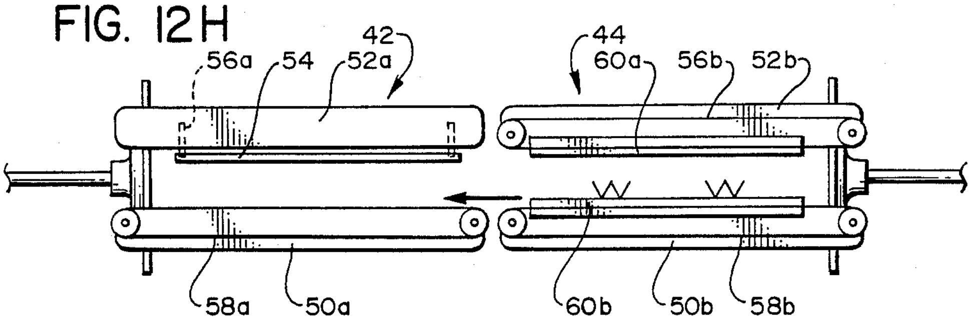
Figure 12I:
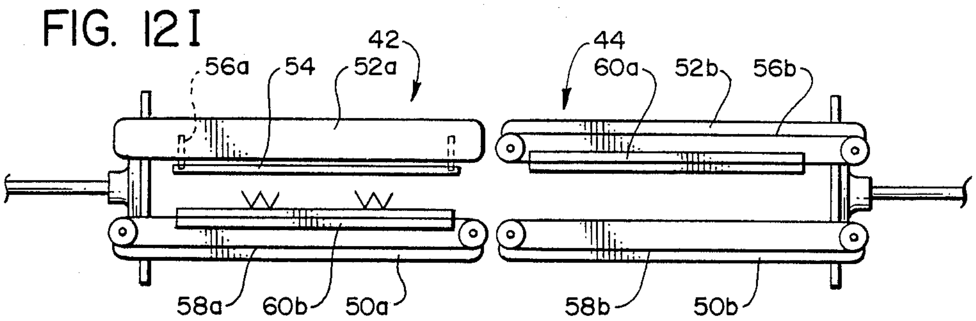

As shown in FIG. 12F, the upper and lower support frames 50b and 54b are then moved toward one another so that the frames yieldingly engage the two workpieces 62 so as to hold these securely between the two trays 60a and 60b. Then, as shown in FIG. 12G, the shaft 48b is rotated 180° so as to invert the two frames 50b and 52b. The frames 50b and 52b are then moved apart (see FIG. 12H), and then the upper transfer conveyor 58b (which is now at a lower position) is operated to move the transfer tray 60b to the left (as seen in FIG. 12H) onto the upper tray support frame 50a (which is now at a lower position), this being shown in FIGS. 12H and 12I.

Figure 12J:
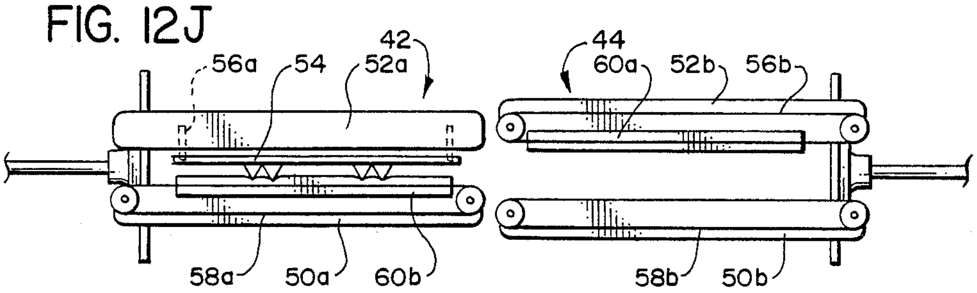
Figure 12K:
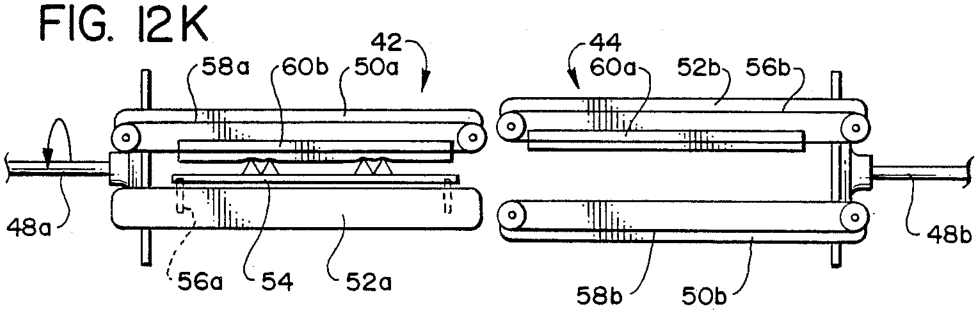

Next, as shown in FIG. 12J, the upper and lower tray support frames 50a and 52a are moved toward one another to hold the workpieces 62 securely in place between the two trays 54 and 60b. Then, as shown in FIG. 12K, the shaft 48a is rotated so that now the carrying tray 54 is at a lower position. Then, as illustrated in FIG. 12L, the upper and lower tray support frames 50a and 52a are moved vertically away from one another, so that the carrying tray 54 can now be moved forwardly by the lower conveyor 56a onto the conveyor 32.

Figure 12L:
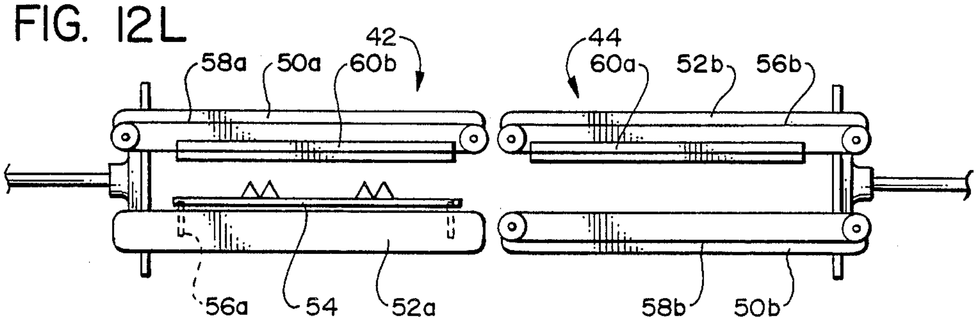

By comparing FIG. 12A with FIG. 12L, it can be seen that the workpieces 62 remain positioned on the same carrying tray 54, but have been inverted so their unpainted (or partially unpainted) surfaces are exposed. Also, it will be noted that in following the steps illustrated in FIGS. 12A through 12L, the two transfer trays 60a and 60b have actually changed position. Thus, when the next carrying tray 54 moved into the first section 42 of the inverting unit 30, the transfer tray 60b will be in the left hand position of FIG. 12A so as to make the initial engagement with the workpieces 62, as shown in FIG. 12B.

(c) Detailed Description of the Inverting Unit 30

We will now proceed to a more detailed description of the inverting unit 30. In describing the total inverting unit 30 with respect to FIGS. 12A through 12L, for clarification the "a" and "b" suffixes were added to the numerical designation to distinguish the two inverting sections 42 and 44. However, in the remaining detailed description of the left inverting section 42, these "a" suffixes will be omitted, except where the suffixes were used previously with reference to the components 46a through 62a and 46b through 62b.

Figure 6:
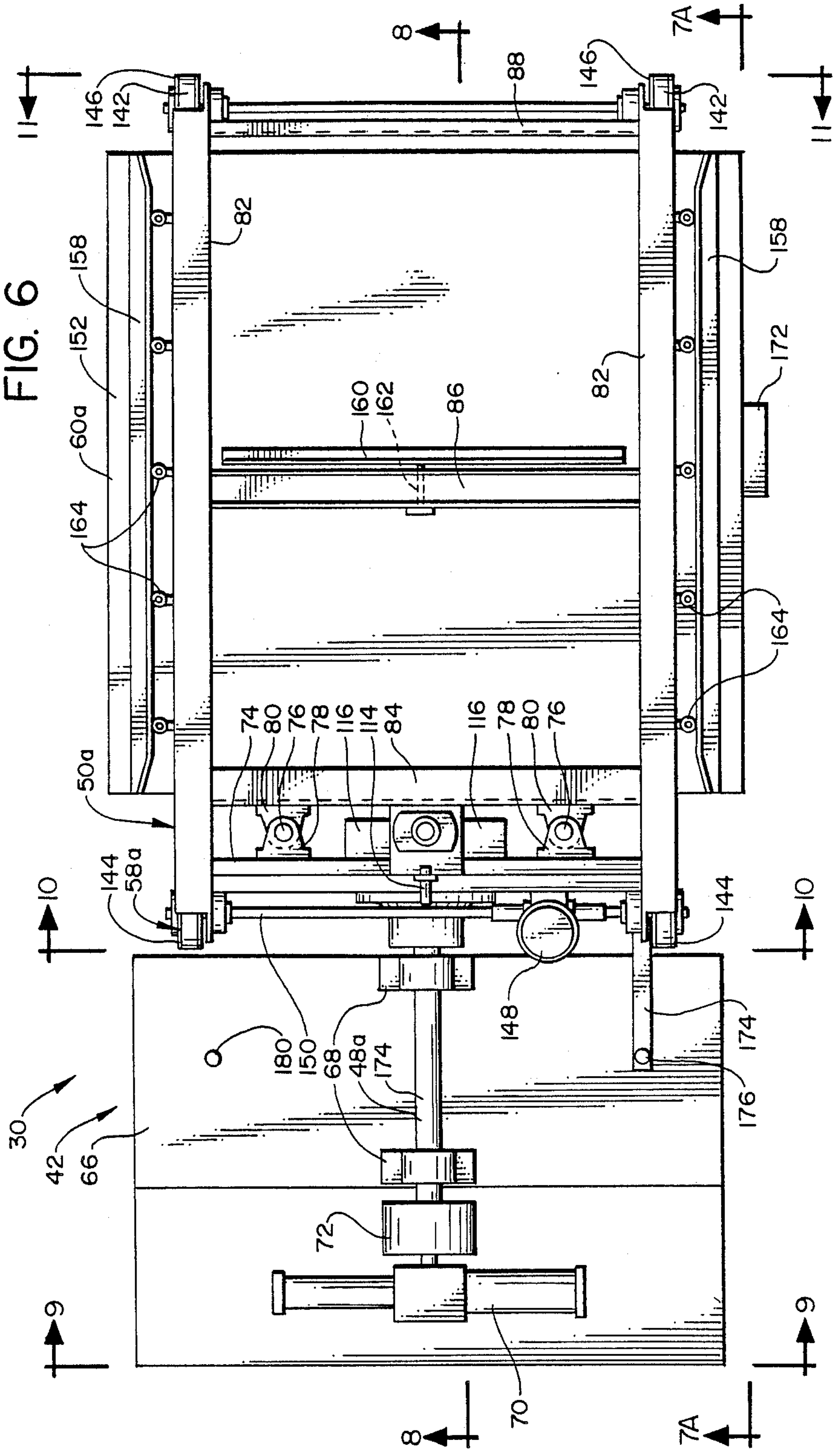
FIG. 6 is a top plan view of a first section of an inverting unit of the present invention.
Figure 7A:
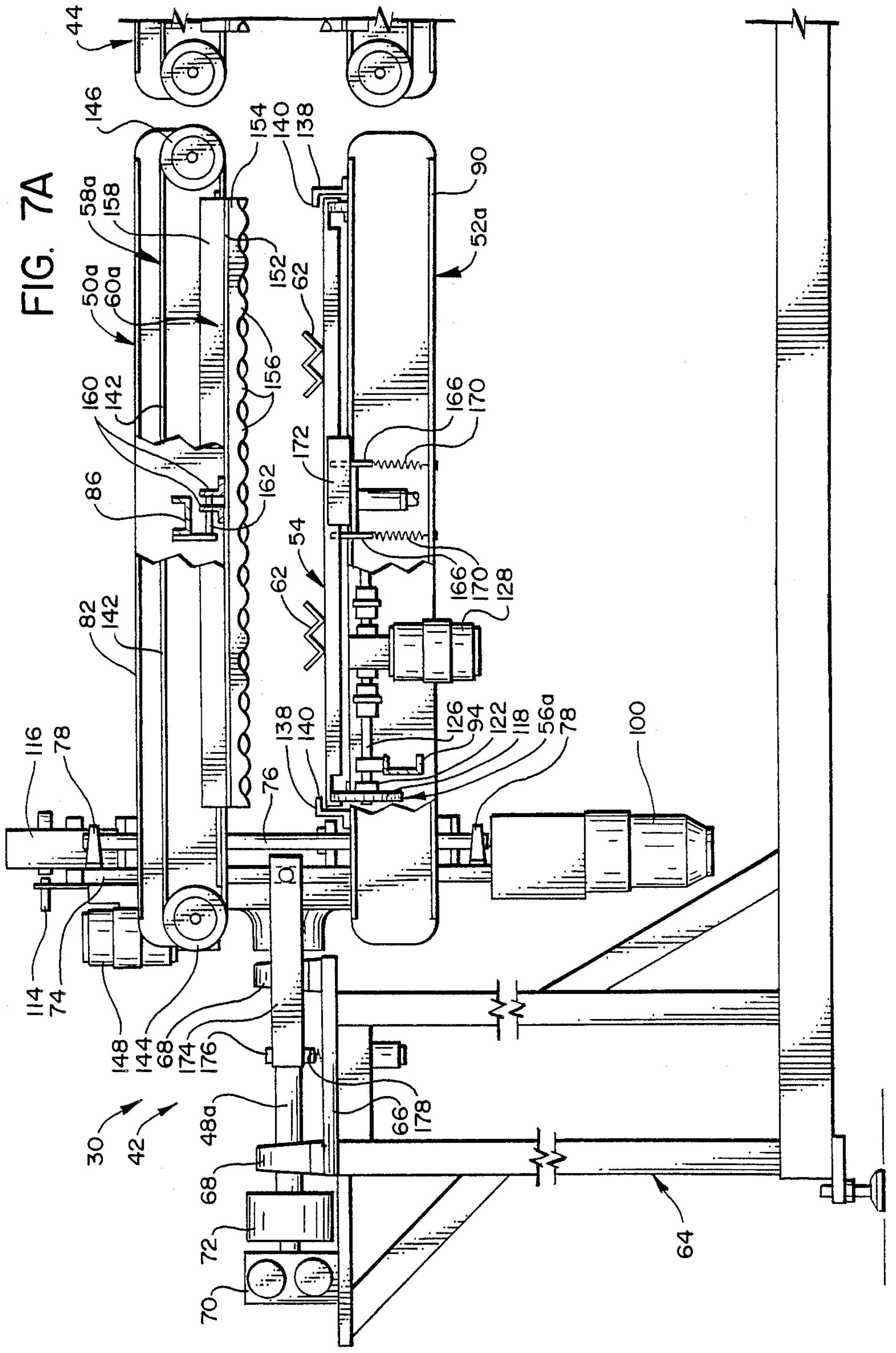
FIG. 7A is a side elevational view of the first section of the inverting unit shown in FIG. 6, taken at the location of line 7A—7A of FIG. 6.

Reference is made initially to FIGS. 6 and 7A which show the left inverting section 40, with FIG. 6 being a top plan view, and FIG. 7A being a front elevational view. There is a main base frame 64 (see FIG. 7A) having an upper support platform 66 on which the aforementioned shaft 48a is mounted by means of a pair of support members 68 mounted to the platform 66. Connected to the left end of the shaft 48a is an actuator 70 which functions to rotate the shaft 48a through 180°, first in one direction, and then in the opposite rotational direction. A counterweight 72 is connected to the end of the shaft 48a adjacent the actuator 70.

The aforementioned mainframe 46a is in the form of a generally rectangular metal plate 74 which is vertically and longitudinally aligned. This plate 74 is also shown in elevational view in FIGS. 9, 10 and 11. Mounted to the right hand face of the plate 74 are a pair of vertical guide rods 76, connected at their upper and lower ends by brackets 78 to the plate 74. The upper and lower support frames 50a and 52a are mounted to these guide rods 76 by means of support brackets 80. (For ease of illustration, only the upper brackets 80 for the upper frame 50A are shown in FIG. 6, it being understood that similar brackets 80 are provided for the lower support frame 52a.)

The upper support frame 50a (see FIG. 6) is constructed of two side beams 82, in the form of U-shaped channels, and three cross beams 84, 86 and 88. The lower mounting frame 52a is constructed similarly to the upper mounting frame 50a, and comprises two side beams 90, and three cross beams 92, 94 and 96 (see FIGS. 8 and 11). Specifically, there is a left main cross beam 92 by which the lower mounting frame 52a is mounted for vertical slide movement to the aforementioned guide rods 76, and two additional cross beams 94 and 96 which in addition to serving a bracing function for the mounting frame 52a also provide a mounting for the lower conveyor 56a (see FIG. 8).

As indicated previously, to mount the upper and lower tray support frames 50a and 52a to the main plate 74, a pair of guide rods 76 are connected by upper and lower respective mounting brackets 78 to the main plate 74. Another set of two pair of brackets 80 are fixedly connected to the upper and lower tray support frames 50a and 52a and have a slide connection to the guide rods 76. The aforementioned mounting brackets 80 are connected to the left beam 84 of the frame 50a and to the left beam 92 of the lower frame 52a, as shown in FIG. 8.

Figure 8:
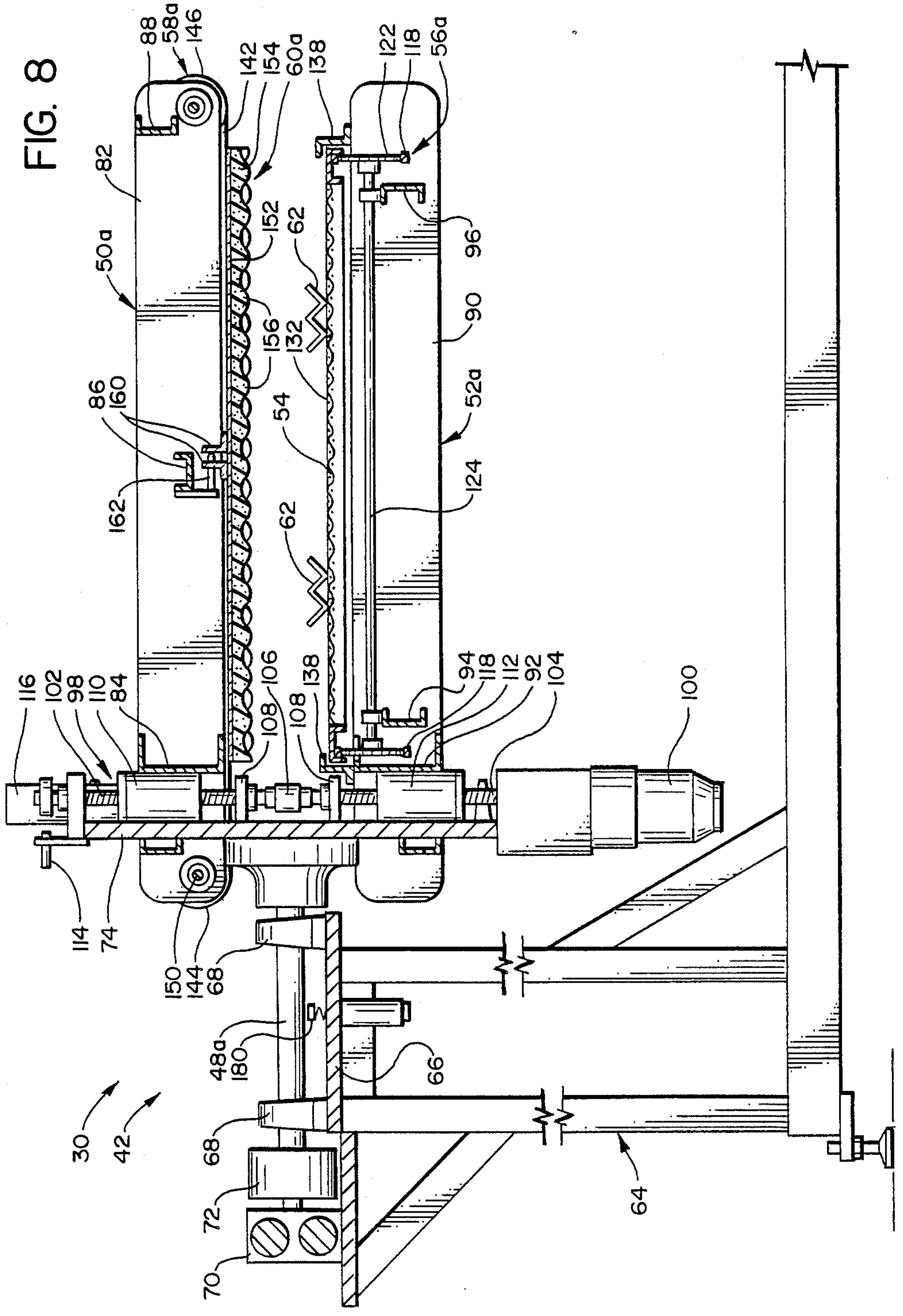
FIG. 8 is a sectional view through the first section of the inverting unit of FIG. 6, taken along line 8—8 of FIG. 6.

To move the two support frames 50*a* and 52*a* vertically, there is provided a screw drive 98 (see FIG. 8). This screw drive 98 comprises a motor 100 which acts through a clutch 101 to in turn drive upper and lower screw drive members 102 and 104 which are interconnected at 106 and held in position by brackets 108 which are above and below the connecting section 106 and connected to the main plate 74. The screw drive elements 102 and 104 engage, respectively, upper and lower interiorly threaded driven members 110 and 112 that are in turn connected to the upper and lower tray support frames 50*a* and 52*a*, respectively. So that the vertical position of the two frames 50*a* and 52*a* can be determined, there is provided a counting device 114 (see FIG. 8) which counts each rotation of the screw drive elements 102 and 104. Since the structure and operation of such counters are well known in the prior art, this counter 114 will not be described in any detail herein. Also, a pair of counterweights 116 is connected to the upper end of the main frame 74.

Figure 11:
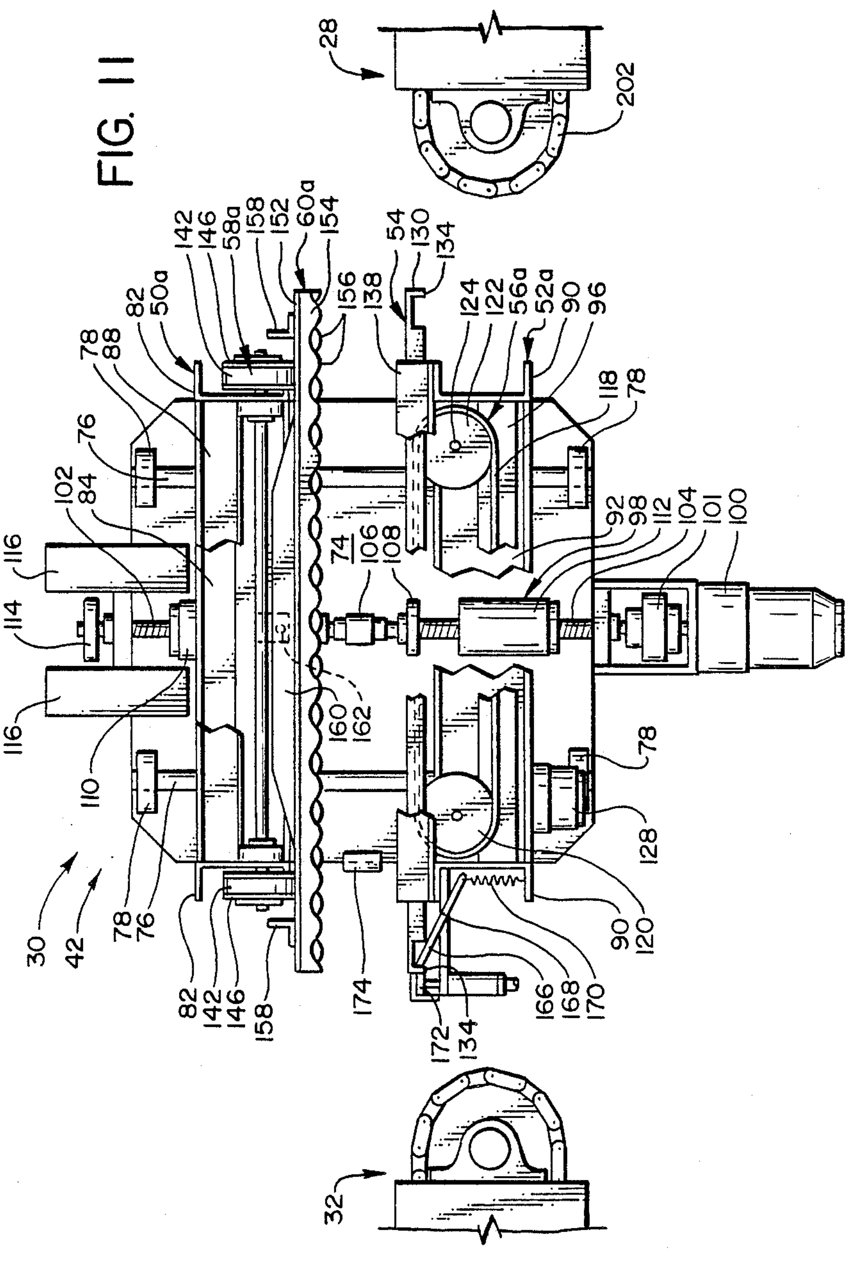
FIG. 11 is another elevational view of the first section of the inverting unit of FIG. 6, taken at the location of line 11—11 of FIG. 6.

The aforementioned lower conveyor 56*a* which is mounted to the lower support frame 52*a* comprises a pair of laterally spaced chains 118 (one of which is shown in FIG. 7A), each of which travels around forward and rear sprockets 120 and 122, respectively (see FIG. 11). The two rear sprockets 122 are interconnected by a shaft 124 which is in turn mounted to the cross beams 94 and 96 (see FIG. 8). The forward sprockets 122 are interconnected by a drive shaft 126 which is in turn driven by an electric motor 128 (see FIG. 7A). The drive shaft 126 is supported by the two cross beams 94 and 96 (see FIG. 7A). The orientation of the two chains 118 of the lower conveyor 56*a* is in a forward to rear direction, (the terms "forward" and "rear" relate to the orientation of the conveyor 32 which leads from the inverting section 30 in a forward direction which is considered to be the direction of travel of the conveyor 32).

Figure 16:
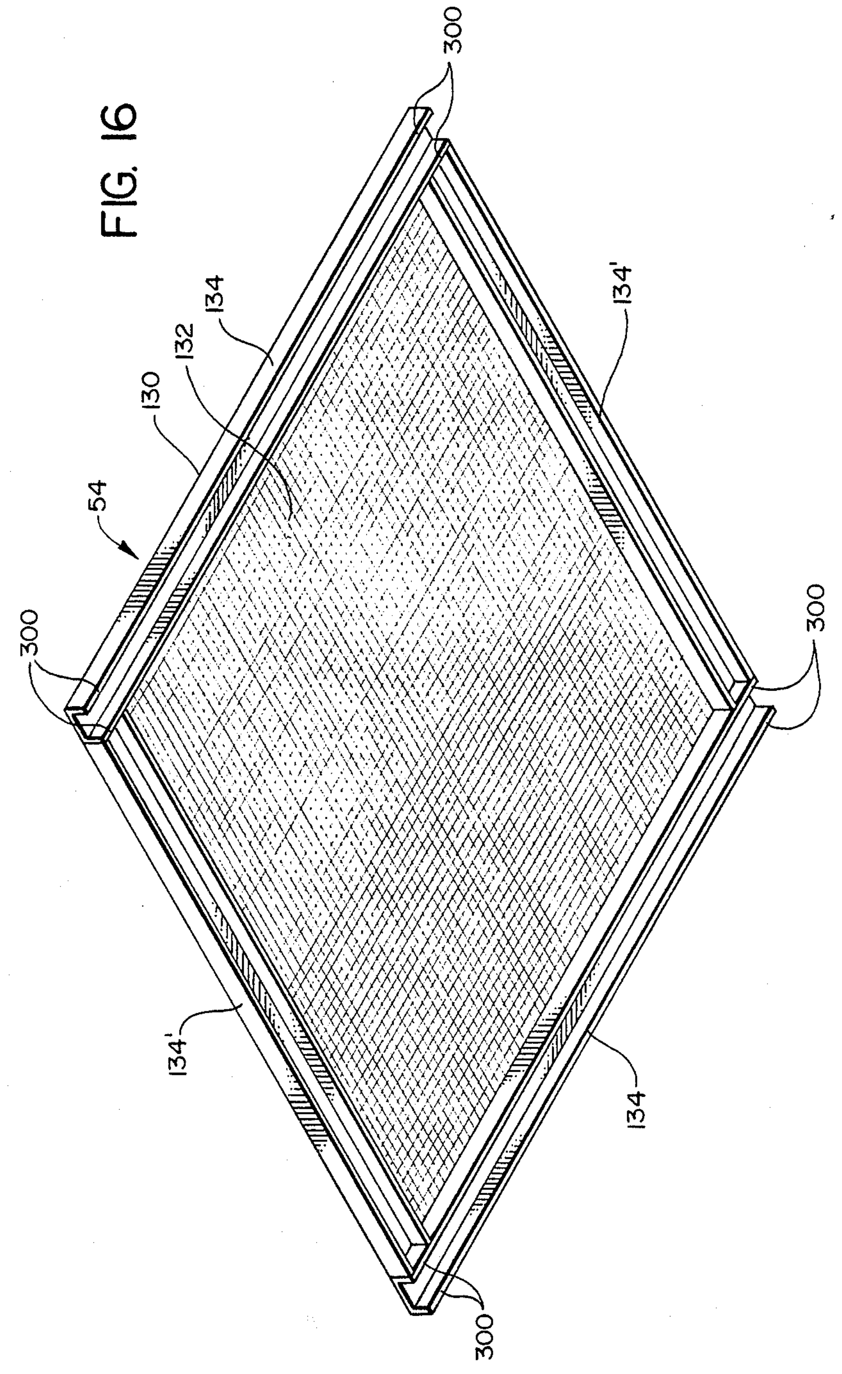
FIG. 16 is an isometric view looking upwardly from a side location at the bottom side of the carrying tray used in the present invention.

As can be seen in FIG. 16, the configuration of the tray 54 is such that it has a square perimeter frame 130 and a main wire mesh support portion 132 extending across the perimeter frame 130. Two sides of the perimeter frame 130 have downwardly extending flanges 134 which fit over the laterally outward edges of each of the chains of the conveyors in the system which are longitudinally aligned (such as the chains 118 of the conveyor 56*a*).

As shown in FIG. 7A, there is a pair of longitudinally aligned guide channels 138 which are positioned a short distance laterally outwardly of the two conveyor chains 118. The two opposite flanges 134 of the tray 54 fit between the two chains 118 and the guide channels 138, and the guide channels 138 each have a laterally inwardly extending lip 140 to retain the tray 54 in place during the inverting of the inverting section 42.

The aforementioned conveyor 58*a* that is mounted to the upper frame 50*a* comprises a pair of laterally oriented conveyor chains 142 mounted on respective left and right sprockets 144 and 146, respectively (see FIG. 7A). The drive for this upper conveyor 58*a* comprises a motor 148 which is drivingly connected to a drive shaft 150 that in turn is connected to the two left sprockets 144 (see FIG. 10). It will be noted that the orientation of the conveyor chains 142 of the upper conveyor 58*a* is at right angles to the orientation of the conveyor chains 118 of the lower conveyor 56*a*.

With reference to FIGS. 7A and 11, it can be seen that the aforementioned transfer tray 60*a* comprises a relatively rigid square backing plate 152 to which is mounted a layer of resilient material 154. This resilient material 154 has a plurality of regularly spaced protruding portions 156 separated by recesses to better enables the foam layer 154 to engage and hold in place differently contoured workpieces 62. Mounted to the upper surface of the backing plate 152 are a pair of guide channels 158 which are positioned outwardly of the conveyor chains 142.

To retain the transfer tray 60*a* adjacent to the conveyor chains 142, there is a pair of flanges 160 (see FIG. 7A and 11) mounted to the central top surface portion of the backing plate 152. These two flanges 160 are provided with aligned through openings which releasably engage a pin 162 that is in turn mounted to the middle cross beam 86 of the upper tray support frame 50*a*. Thus, when the left inverting section 42 is inverted from the position of FIG. 7A so that the transfer tray 60*a* is at a lower location, this tray 60*a* can be moved laterally in a right hand direction, with the flanges 160 simply disengaging the pin 162. To properly locate the transfer tray 60*a* relative to the conveyor chains 142 and the frame 50, there are mounted to the outwardly facing portions of the two side beams 82 of the upper frame 50*a* a plurality of guide roller 164 (see FIG. 6) which engage the guide channels 158.

Figure 9:
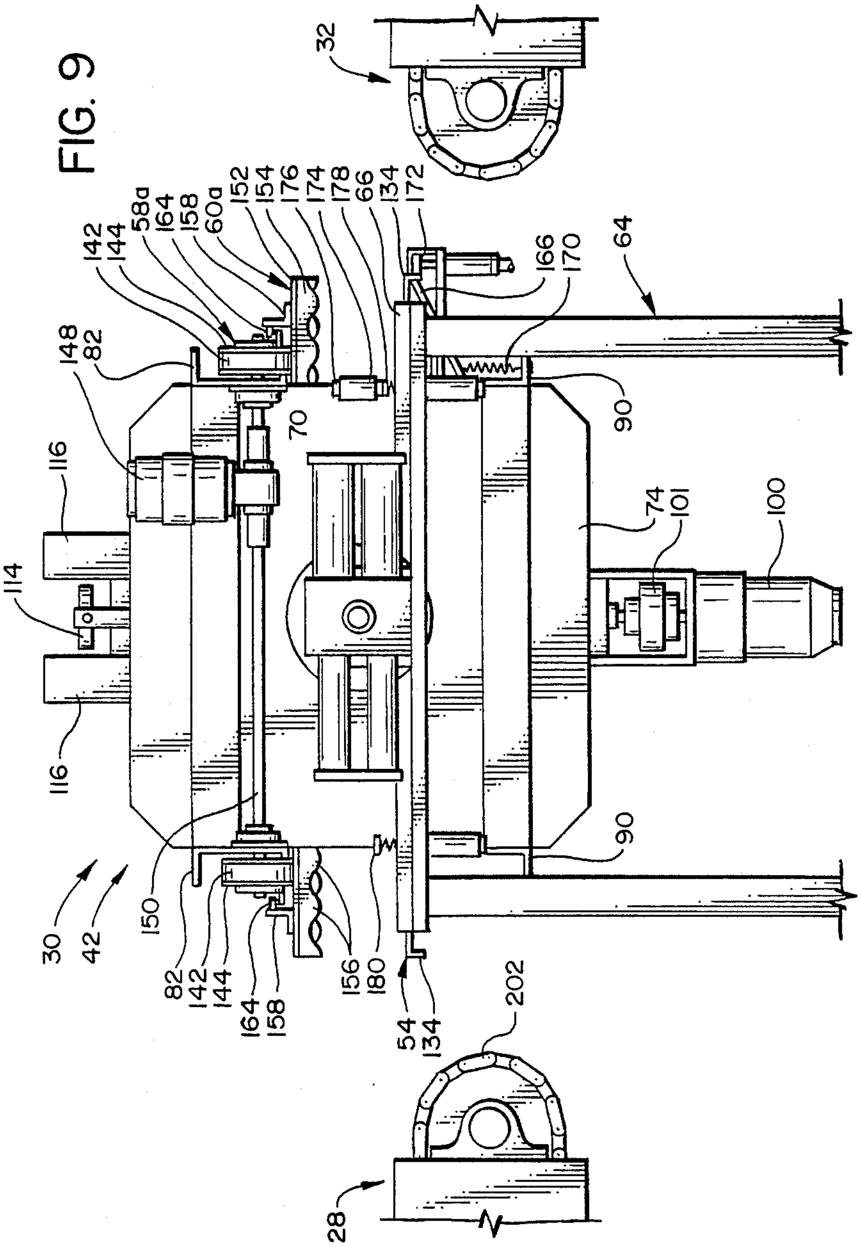
FIG. 9 is an elevational view of the first section of the inverting unit, taken at the location indicated at line 9—9 of FIG. 6.
Figure 10:
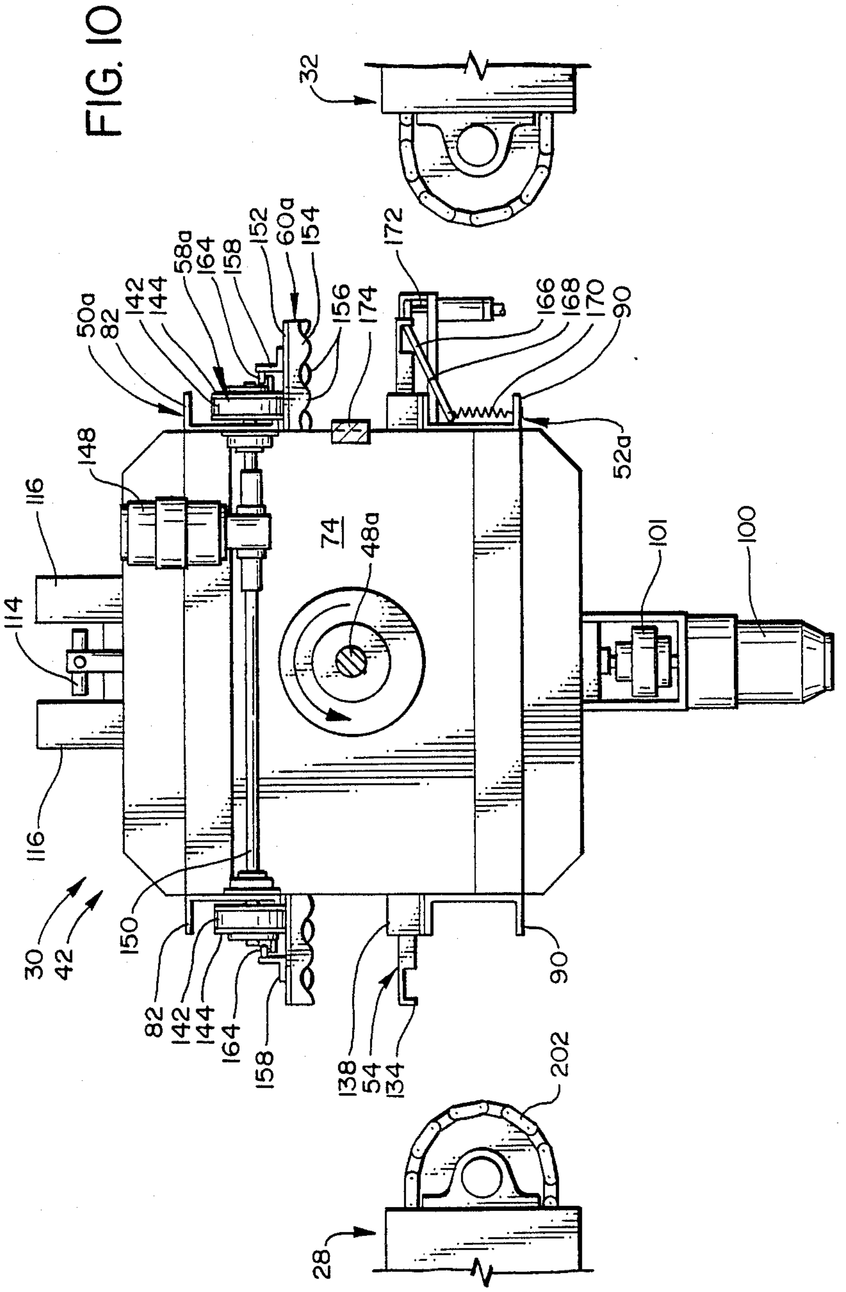
FIG. 10 is a sectional view of the first section of the inverting unit, taken at the location of line 10—10 of FIG. 6.

In order to retain the tray 54 on the lower conveyor chains 118 during the 180° inversion of the left inverting section 42, there is provided a spring retaining finger 166 pivotally mounted at its center at 168, and urged by a tension spring 170 to an upward position where it is able to engage a forwardly positioned flange 134 of the tray 54 (see FIG. 11). When the tray 54 is moved forwardly (in a left to right direction as seen in FIGS. 9 and 10, but in a right to left direction as seen in FIG. 11), the forward flange 134 of the tray 54 engages a retractable stop member 172 which stops the forward travel of the tray 54 so that it is properly located on the lower support frame 52*a*. Also, a forward flange 134' of the tray 54 moves against the upwardly slanted finger 166 to depress this finger 166 as the flange 134' passes over the finger 166 after which this finger 166 springs upwardly (see FIG. 11) to engage the back side of the lip or flange 134' of the tray 54 to retain the tray 54 in its proper location.

To properly control the 180° rotation of the left inverting section 42, there is provided a locating arm 174 connected to the main plate 74 and extending to the left over the platform 66 (see FIGS. 6 and 7A). The left end 176 of this arm 174 engages in the position of FIG. 7A a first locating or stop member 178, and in the inverted position engages a second stop member 180. These stop members are desirably formed as dashpots which can absorb the impact of the arm 174. The dashpots can be adjustable so as to properly accomplish this stop function so that the components are properly located in the two different positions.

To summarize briefly the operation of the left inverting section 44, the main plate 74 with the two tray carrying frames 50*a* and 50*b* is mounted for rotation through 180° by mean of the shaft 48 which is fixedly connected to the plate 74 and rotatably mounted in the brackets 68. The actuator 70 rotates the plate 72 back and forth through 180°, with the locating arm 174 acting with the stop members 178 and 180 to properly limit the rotation at the end limits of travel. The vertical travel of the upper and lower tray mounting frames 50*a* and 52*a* is caused by the screw drive 98 which comprises the motor 100 that rotates the drive screw elements 102 and 104. The tray 54 is moved onto the lower tray support frame 52*a* by means of the conveyor 56*a* which comprises left and right conveyor chains 118 and forward and rear sprockets 122 and 124. The drive motor 128 causes rotation of the forward sprockets 142.

With regard to the upper frame 50*a*, the upper conveyor 58*a* comprises the conveyor chains 142, each of which ride on respective sprockets 144 and 146, with the drive motor 148 driving the left sprockets 144.

Figure 7B:
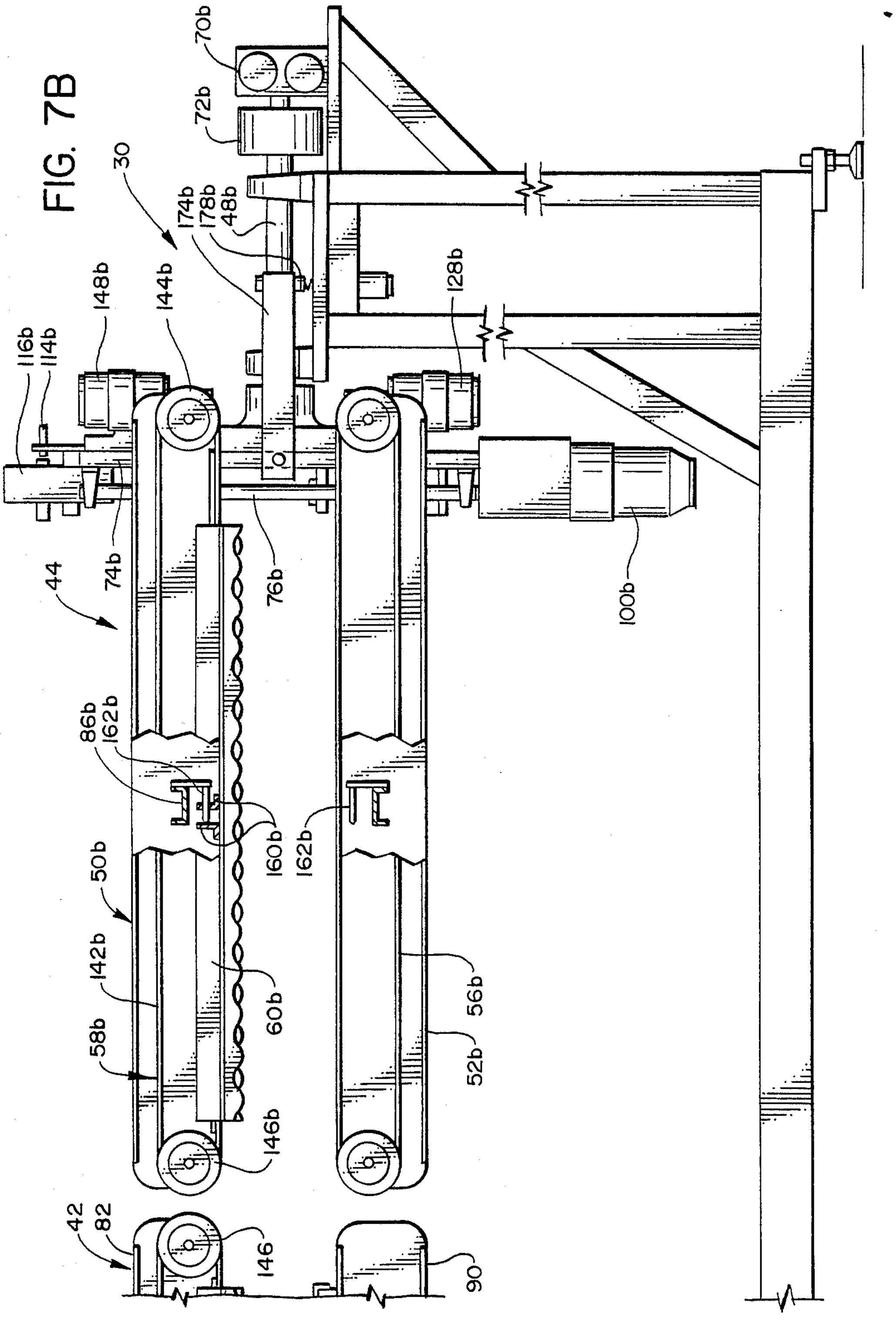
FIG. 7B is a side elevational view similar to FIG. 7A, but showing a second section of the inverting unit.

To describe now the right inverting section 44, reference is made to FIG. 7B. As indicated previously, the right inverting section 44 is substantially the same as the left inverting section 42, except for the lower conveyor 56*b*. The lower conveyor 56*b* is substantially identical to the upper conveyor 58*b*, which in turn is substantially identical to the upper conveyor 58*a* of the left inverting section 42. Accordingly, there will be no detailed description of this right inverting section 44. Rather, in FIG. 7B there will be given numerical designations corresponding to those of the left inverting section 42, with the "b" suffix added to distinguish those of the right inverting section.

Each of the conveyors 58*a*, 58*b* and 56*b* operate to move the appropriate transfer tray 60*a* or 60*b* laterally. When the flanges 160 of the transfer tray 60*a* or 60*b* come into engagement with the pin 162 or 162*b*, the transfer tray 60*a* or 60*b* is securely held to the appropriate tray carrying frame 50*a*, 50*b* or 52*b*, with the pin 162 or 162*b* along with its related mounting member properly locating the transfer tray 60*a* or 60*b*.

(d) Detailed Description of the Gauging Unit 28

Reference is made to FIGS. 2 through 5, where it can be seen that gauging unit 28 comprises a base frame 200 to which is mounted a conveyor 202 and a gauging mechanism 204. The conveyor 202 functions to move the tray 54 with the parts 62 thereon into a gauging area, after which the gauging mechanism descends to come into contact with the parts 62 to ascertain the maximum height dimension of the parts 62.

The conveyor 202 comprises a pair of left and right conveying chains 206 which ride on respective forward and rear sprockets 208 and 210. An electric motor 212 drives the rear sprockets 210 through a chain and sprocket transmission 214. The conveying chains 206 are longitudinally aligned so as to be in alignment with, and at the same level as, the drive chains 118 mounted to the lower tray support frame 52*a* of the left inverting section 42 of the inverting unit 30. As can be seen FIG. 11, this enables each tray 54 to move forwardly from the conveyor 202 onto the conveyor 56*b* which comprises the two conveying chains 118 of the inverting unit 30.

The gauging mechanism 204 comprises a gauging plate 216 mounted for limited up and down movement to a mounting frame 218 which is in turn slide mounted for vertical movement to vertical guide rods 220 which are in turn fixedly connected to the base frame 200. Vertical movement of the mounting frame 218 (and also the gauging plate 216) is accomplished by means of a screw drive 222 which comprises a drive screw element 224 which is rotated by an electric motor 226 that is in turn mounted to an upper portion of the base frame 200. The drive screw 224 engages a threaded socket member 228 that is in turn fixedly secured to the mounting frame 218. A suitable counter 230 is positioned at an upper location adjacent to an axial extension of the drive screw element 224 to count the rotations of the drive screw element 224. Since this counter 230 is or may be of conventional design, there will be no detailed description of the same.

Figure 3:
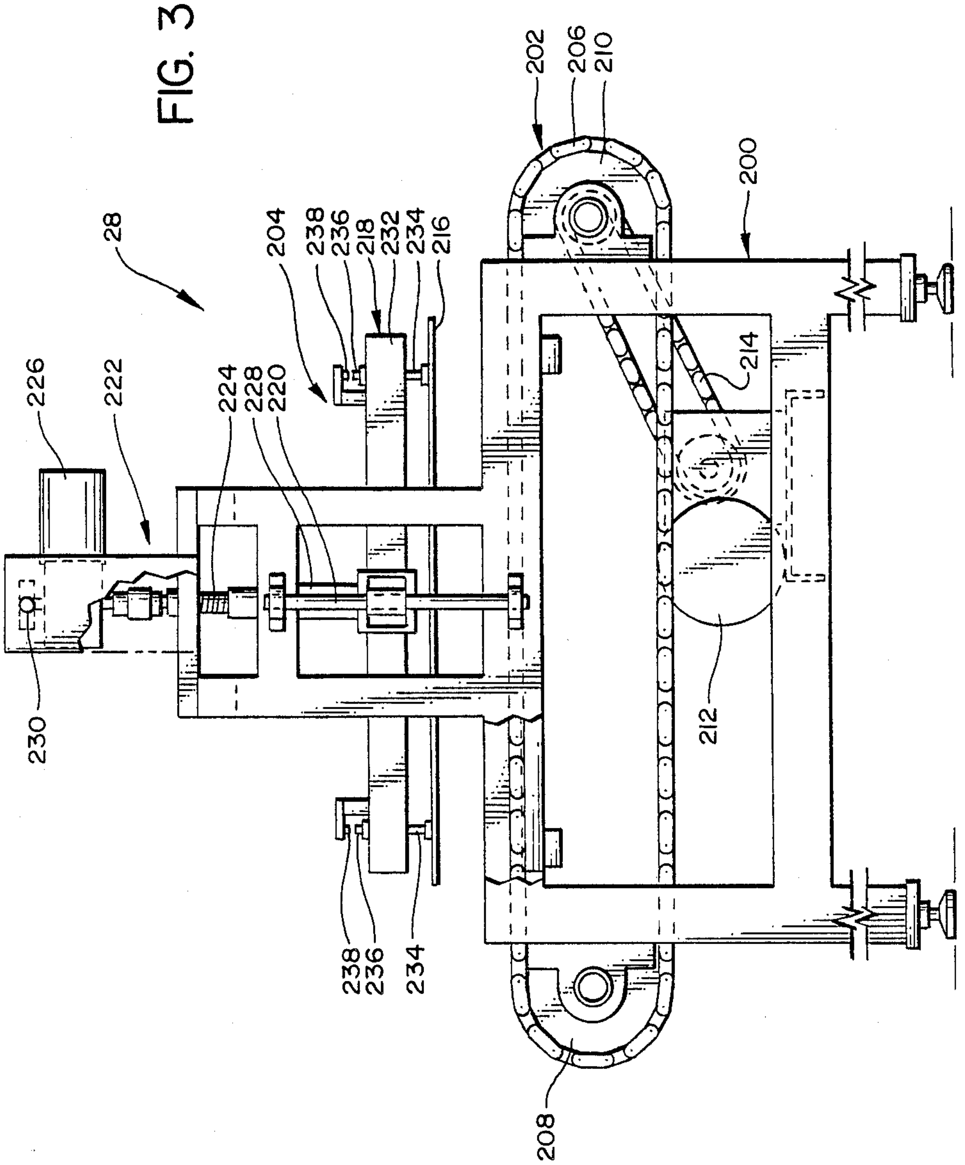
FIG. 3 is a side elevational view of the gauging unit of FIG. 2 taken at the location of line 3—3 of FIG. 2.
Figure 4:
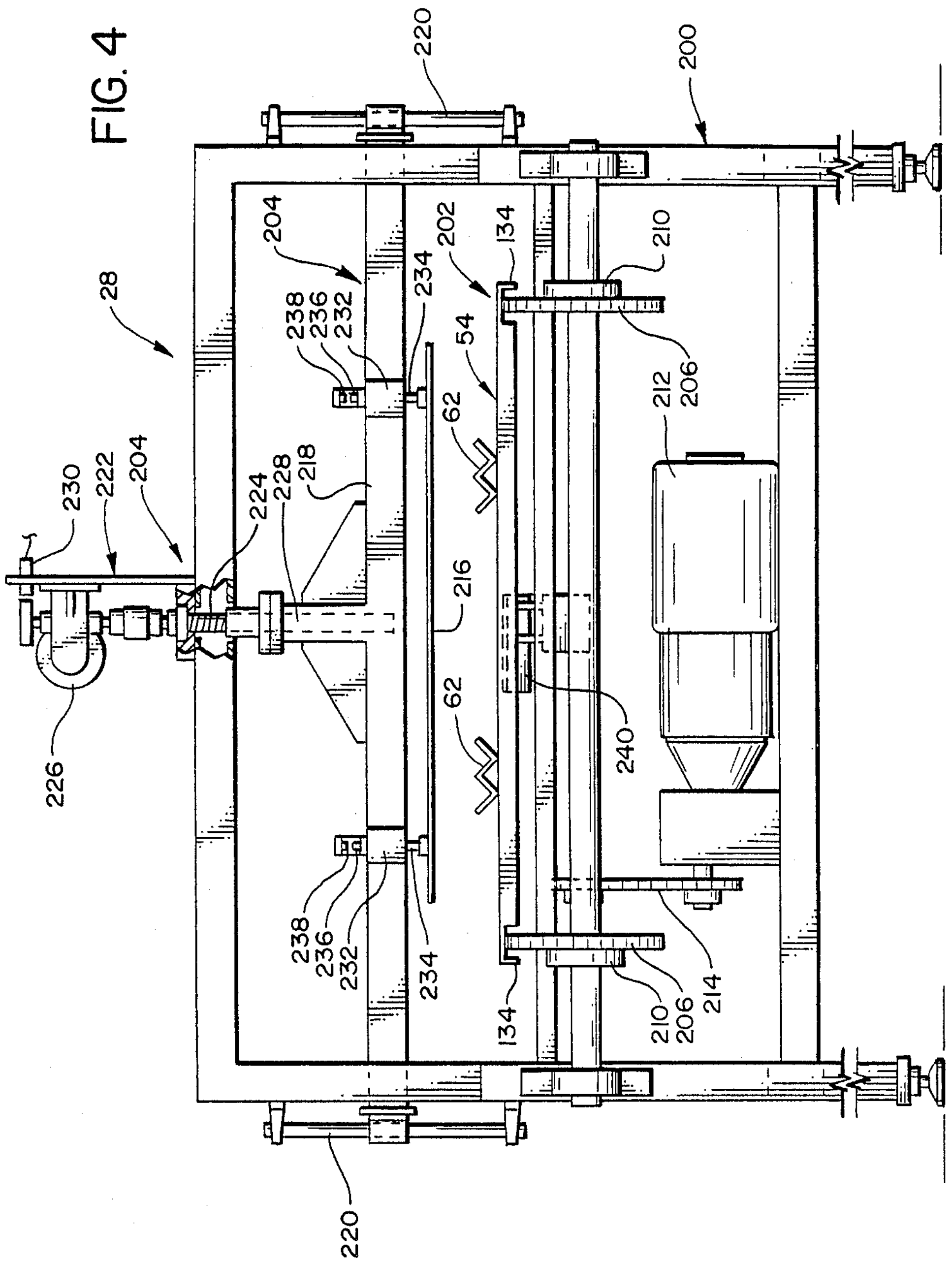
FIG. 4 is a second side elevational view of the gauging unit, taken from the location indicated at line 4—4 of FIG. 2.

The gauging plate 216 has a generally square configuration, and it is mounted at its four corner portions to opposite ends of two arms 232 of the mounting frame 218. More specifically, at each corner location of the plate 216, there is fixedly connected thereto an upstanding pin 234 which has an upper contact end 236 which is positioned to engage a respective sensing element 238. Gravity normally causing the gauging plate 216 to drop down to a lower position, as shown in FIGS. 3 and 4. The upper end of each pin 234 is provided with a stop member to limit the downward travel of the pin 234 relative to the mounting frame 218. At the lower position, the contact end 236 of each pin 234 is spaced downwardly from its related sensing element 238.

Figure 5:
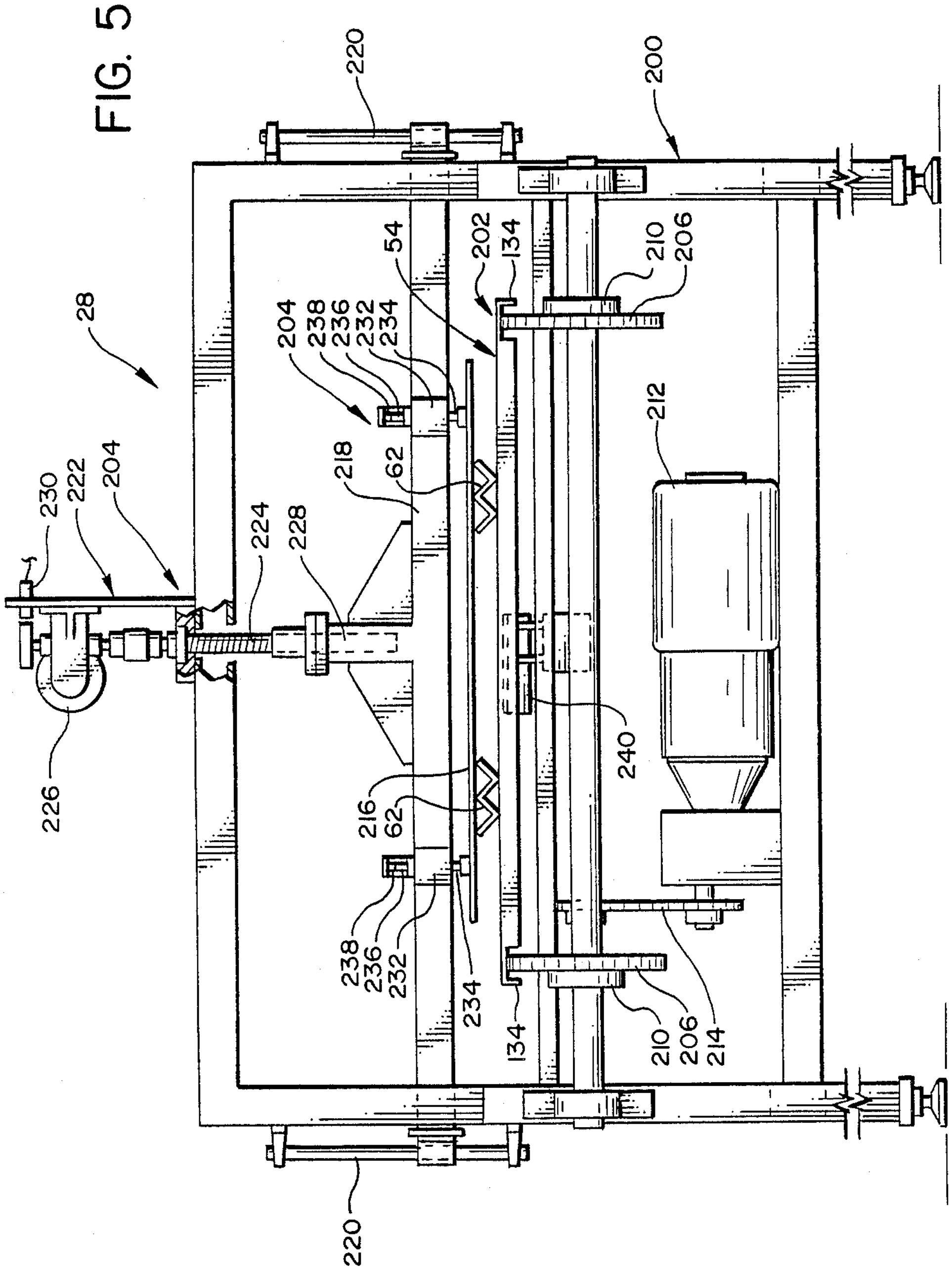
FIG. 5 is a view similar to FIG. 4, but showing the platform of the gauging unit moved downwardly into its workpiece engaging position.

As can be seen in viewing FIGS. 4 and 5, when the mounting frame 218 is lowered toward the workpieces 62 so that the gauging plate 216 comes in contact with the workpieces 62, the gauging plate 216 is pushed by the workpieces 62 upwardly until one or more of the contact ends 236 of the pins 234 come into contact with one or more of the sensing element 238. Suitable control circuitry is provided so that when contact is made with one or more of the sensing elements 238, the motor 226 is stopped, with the counter 230 having sensed the number of rotations of the screw drive element 222. The information from the counter 230 is then automatically transmitted through suitable control means to the control devices for the motors 100 and 100*b* which cause the vertical movement of the upper and lower tray support frames 50*a*, 50*b*, 52*a* and 52*b*. Then, the motors 100 and 100*b* are caused to rotate the drive screw elements 102 and 104 (or 102*b* and 104*b*) through the appropriate number of rotations so that the trays 54, 60*a* and 60*b* are at the appropriate gripping pressure to properly engage the workpieces 62.

After the mounting frame 218 has descended the appropriate distance to enable the engaging plate 216 to determine the maximum depth dimension of the workpieces 62, then the automatic control circuitry simply causes the mounting frame 218 to move upwardly (by opposite rotation of the drive screw element 224). Then the conveyor 222 is operated to move the tray 54 from the gauging station onto the conveyor 56*a* of the left section 42 of the inverting unit 30.

To locate each tray 54 at the proper gauging position, there is provided a locating sensor 240 which is activated by engagement with the leading edge of the tray 54. This locating sensor 240 in turn stops rotating of the motor 212 to thus stop the conveyor 202. After the gauging operation, the sensing element of the sensor 240 is retracted to permit the tray 54 to move the left section 42 of the inverting unit 30.

(e) The Conveyor Transfer System 41

As shown in FIG. 1, at various locations in the system 10, it is necessary for each tray 54 to be moved from the end of one conveyor onto another conveyor traveling at right angles to the first conveyor. Further, depending upon the particular arrangement of the system, it may be necessary for the elevation of two adjacent conveyors to be different from one another. For example, the trays which move from the cooling station 24 are transferred onto the conveyor 26, with this conveyor 26 traveling below an adjacent conveyor that moves out of the cooling station 24. In this arrangement, the conveyor 26 would be lower than the exit end of the conveyor 18 exiting from the cooling station 24. Also, it is desirable that these transfers be accomplished without rotating the tray.

Figure 13:
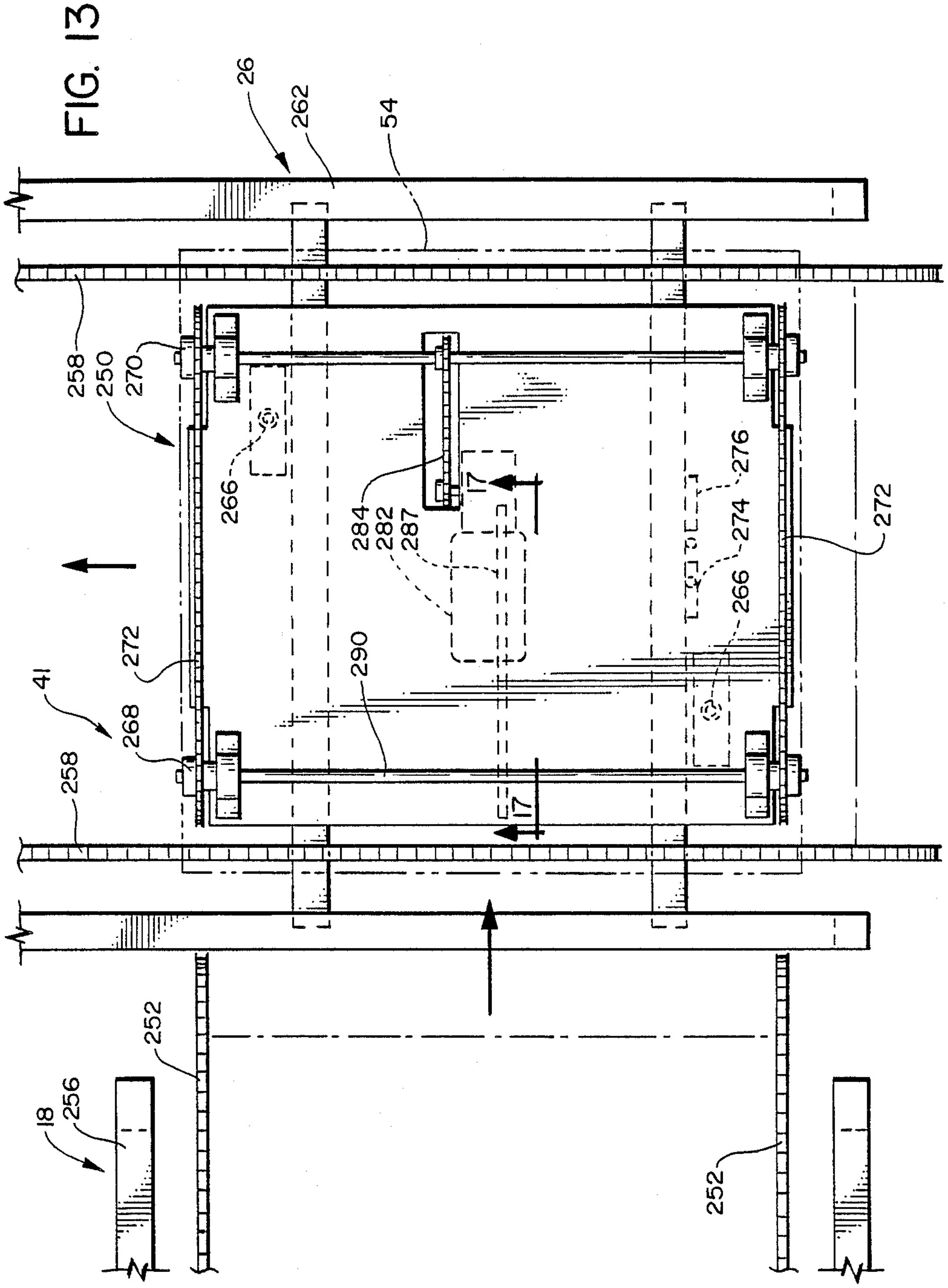
FIG. 13 is a top plan view of a transfer unit used in the present invention to move a carrying tray from one conveyor to another.
Figure 14:
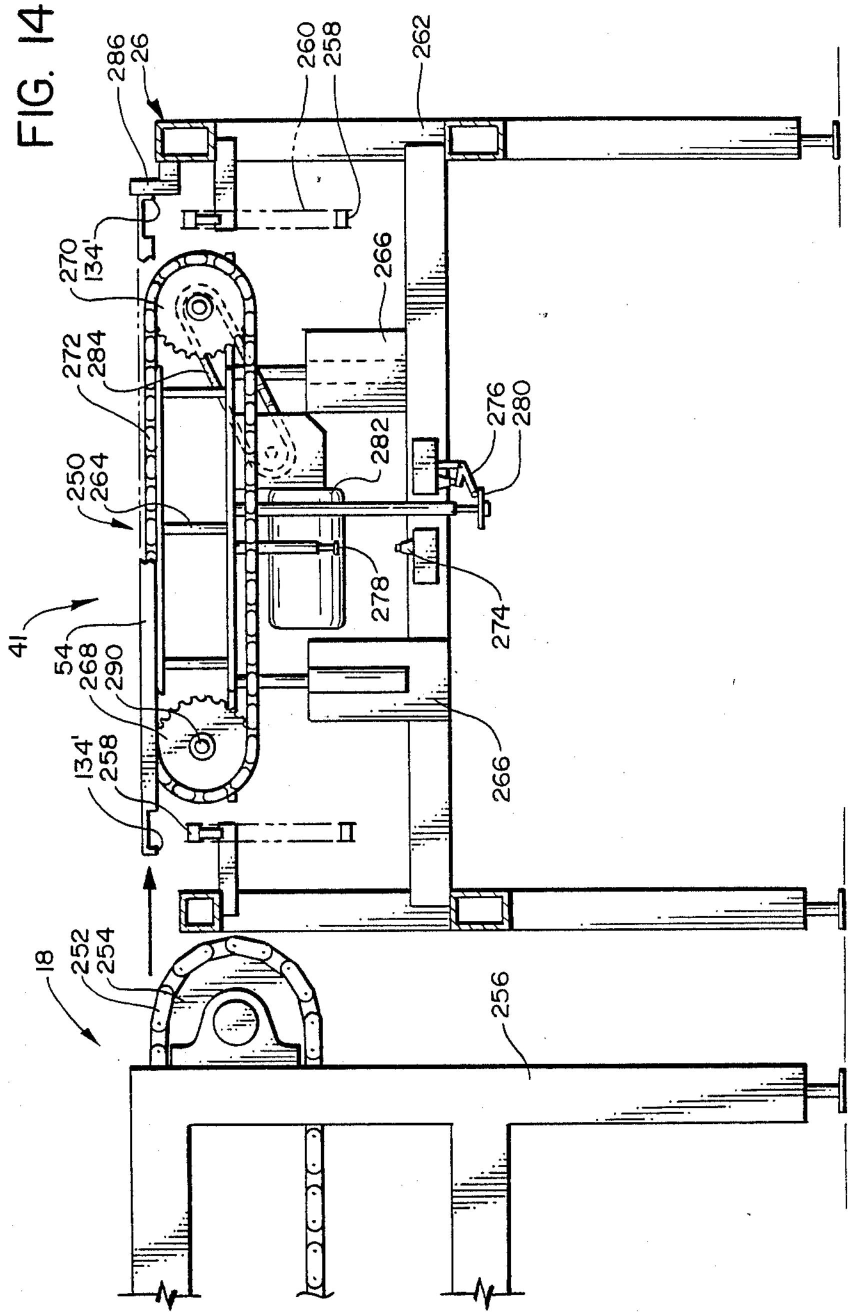
FIG. 14 is an elevational view taken at line 14—14 of FIG. 13, showing the transfer unit of FIG. 13.
Figure 15:
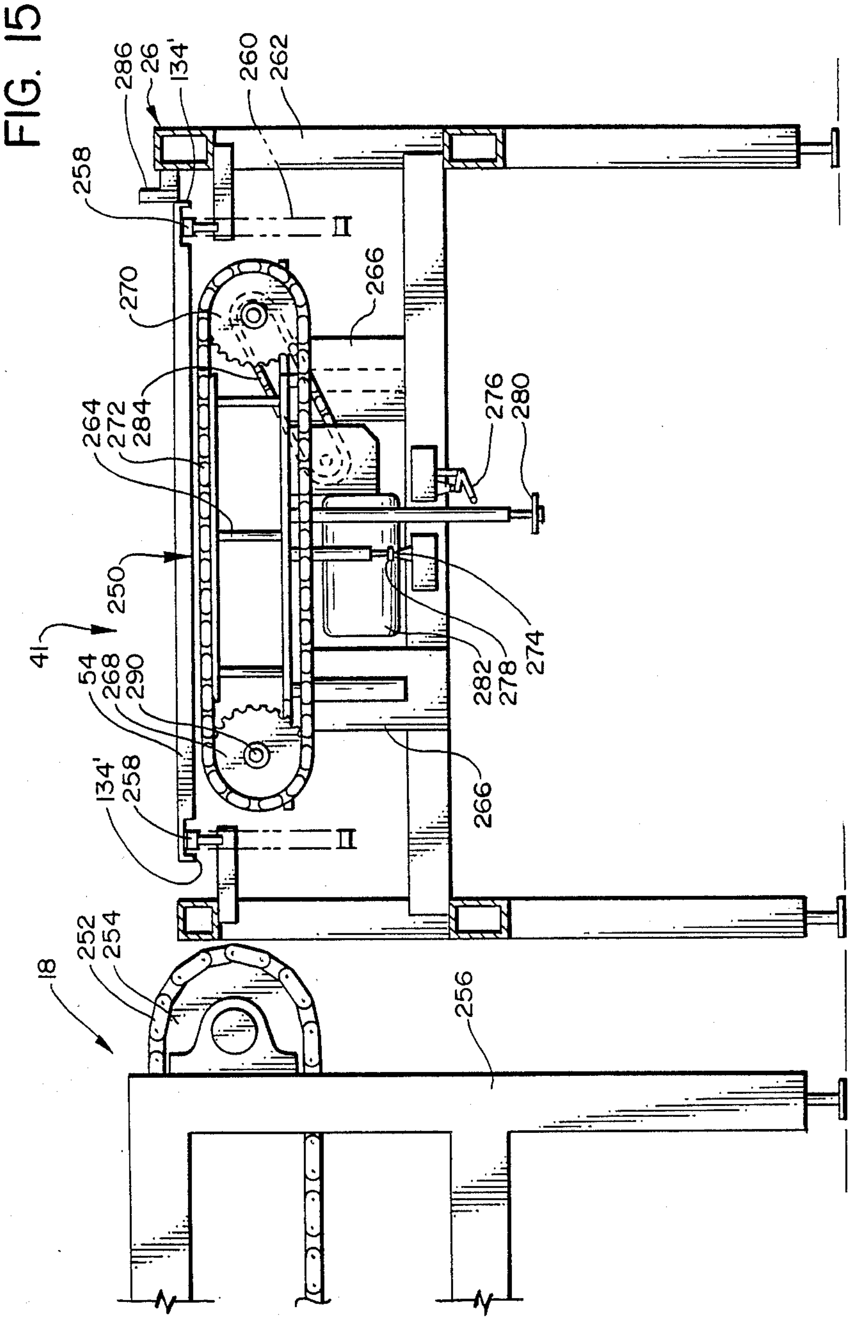
FIG. 15 is a view similar to FIG. 14, showing a portion of the transfer unit being moved downwardly to a transfer location.

The conveyor transfer system is shown in detail in FIGS. 13 through 15. The transfer assembly 41 will be described specifically with reference to that assembly 41 which is located at the exit end of the conveyor 18 and at the loading end of the conveyor 26.

As shown in FIGS. 13 through 15, the conveyor transfer assembly 41 comprises a first main conveyor 18, a second main conveyor 26, and a transfer conveyor 250. (It is to be understood that at other locations of the conveying transfer assembly 41, the identification of the two main conveyors 18 and 26 would be different. For example, the conveying transfer assembly 41 could also comprise the conveyors 14 and 16 as the two main conveyors.)

The main conveyor 18 comprises two laterally spaced conveying chains 252 which travel around respective end sprockets 254, with these being supported by a suitable base frame 256. In like manner, the second main conveyor 26 comprises two laterally spaced conveying chains 258 which travel around end sprockets 260 at the loading end thereof, with these being supported by a base frame 262.

The base frame 262 of the second main conveyor 26 also serves as a base frame for the transfer conveyor 250. The transfer conveyor 250 comprises a mounting frame 264 which is mounted to the base frame 262 for limited vertical movement with respect thereto by means of a pair of hydraulic jacks 266. This vertically movable frame 266 in turn carries two forward and two rear sprockets 268 and 270 respectively, each of which has an associated conveying chain 272. The two conveying chains 272 are aligned with the two conveying chains 252 of the first main conveyor 18.

The upper and lower limits of travel of the movable frame 264 are controlled by two limit switches 274 and 276. The first limit switch 274 is engaged by a contact member 278 extending downwardly from the frame 264 to come into engagement with the switch 274 at the lower limit of travel of the frame 264. There is a second contact member 280, also attached to the frame 264, and this engages the switch 276 to limit the upward travel of the frame 274.

To drive the conveying chains 272, there is provided an electric motor 282 which acts through a chain and sprocket transmission 284 to in turn rotate the rear sprockets 270 under power.

Figure 17:
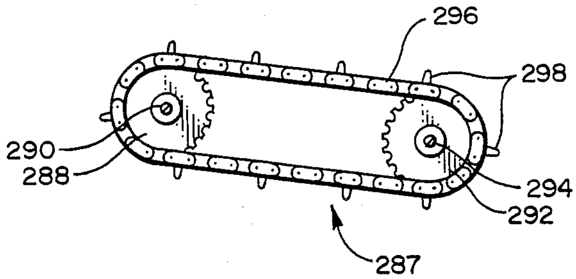
FIG. 17 is a sectional view taken along line 17—17 of FIG. 13, illustrating an auxiliary conveyor of the present invention.

Since the conveying chains 272 depend upon frictional engagement with the tray 54 to move the tray 54 into its appropriate transfer position on top of the conveying chains 272, as an added assurance to make sure that the tray 54 does properly move onto the conveyor chains 272, there is provided an auxiliary conveyor 287, shown in FIG. 17. This conveyor 287 comprises a forward sprocket 288 which is fixedly connected to the shaft 290 to which the two forward sprockets 268 are connected. This conveyor 287 is positioned intermediate the two chains 272 of the transfer conveyor 250.

There is a rear sprocket 292 which rotates about a shaft 294 positioned at a vertical location a moderate distance below that of the shaft 290. Thus, a conveying chain 296 that travels over the sprockets 288 and 292 has it upper run slanting in a moderate rearward and downward direction. The chain 296 has a plurality of upwardly extending fingers or protrusions 298 (only a few of which are shown in FIG. 17).

In operation, as the tray 54 moves onto the forward part of the transfer conveyor 250, one of the fingers 298 engages the adjacent flange 134' of the tray 54 so that there is positive engagement with the chain 296. As the appropriate finger 298 moves the tray 54 rearwardly so that it is further onto the transfer conveyor 250, the downward slope of the upper run of the chain 296 causes disengagement of the finger or fingers 298 with the flange 134' of the tray 54 after a moderate distance of travel.

To describe the operation of this transfer system 41, when the tray 54 is moving from the conveyor 18, the transfer conveyor 250 is at the upper position shown in FIG. 14. The conveyor chains 272 of the transfer conveyor 250 are aligned with the conveying chains 252 of the main conveyor 18. The tray 54 moves from the conveying chains 252 onto the conveying chains 272. Stop mechanism 286 stops the tray 54 at the appropriate location and this stop mechanism 286 can also serve as a sensing mechanism to stop the operation of the motor 282 to stop travel of the conveying chains 272.

With the tray 54 being properly located at a transfer location on the transfer conveyor 250, the hydraulic jack 266 are operated to lower the conveyor 250 to the location of FIG. 15 where two opposite edge portions of the tray 54 come into contact with the conveying chains 258 of the second main conveyor 26. As indicated previously, the limit switch 274 stops the downward movement of the conveyor 250, and this is accomplished in a manner that the conveyor 250 is out of contact with the tray 5 when the transfer conveyor 250 has moved to its furthest downward location, as shown in FIG. 15. Then the main conveyor 26 is operated to carry the tray 54 from the transfer system 41 to a further downstream transfer system 41 where the tray 54 is then moved into the gauging unit 28.

To transfer the tray 54 from a lower conveyor to an upper conveyor the opposite procedure is followed. More specifically, when the tray reaches the transfer location at the downstream end of the lower conveyor, the transfer conveyor 250 is moved upwardly to lift the tray 54 from the lower conveyor up to the level of the upper conveyor. Then the transfer conveyor 250 is operated to move the tray 54 onto the upstream end of the upper conveyor. More specifically, for example, the transfer conveyor 250 of the transfer system adjacent the gauging unit 28 is arranged so that the conveyor chains 272 are longitudinally aligned to move the tray 54 to the gauging unit 28. The transfer conveyor 250 is raised to lift the tray 54 free of the conveying chains 258, after which a suitable control mechanism causes movement of the transfer conveyor 250 of the subsequent transfer system 41 to move the tray 54 into the gauging unit 28.

It will be noted that in FIGS. 14 and 15, the tray 54 is shown as having two open channels defined by the downwardly extending lips or flanges 134' that position the tray 54 on the conveying chains 258. This is an alternative arrangement of the tray 54 shown in FIG. 16. If the tray 54 (exactly as shown in FIG. 16) were to be positioned on the conveying chains 258, the corner frame portions indicated at 300 would rest upon the conveying chains 258. However, with these frame corner portions removed, then it is possible for the outer flanges 134' to function to define conveyor chain receiving channels in the same manner as the flanges 134 so as to properly locate the tray 54 on the conveying chains 258.

(f) Overall Operation of the Apparatus

To review briefly the overall operation of the apparatus 10, as indicated previously with reference to FIG. 1, each tray 54 is moved onto the conveyor 14 at the loading station 12. When the tray with the workpieces 62 thereon arrives at the first transfer location 41, the tray 54, without being rotated about a vertical axis, is transferred onto the conveyor 16. The transfer from the conveyor 14 to the conveyor 16 is accomplished in the manner described with reference to section (e) of this description, where the transfer system 41 is described in detail. Then the tray moves through the painting station 20, drying station 22 and cooling station 24 to be deposited onto the conveyor 26 (in the manner described previously in section (e) of this description) and then sent to the gauging unit 28.

As described previously, in the gauging unit 28 (see FIGS. 2 through 5), the gauging plate 216 moves into engagement with the workpiece or workpieces 62 which has the greatest vertical dimension, at which time the gauging plate stops, this being accomplished by the elements 236 coming into contact with the sensing elements 238. The counter 230, by counting the rotations of the screw drive element 220, thus is able to ascertain the location at which the gauging plate 216 comes to a stop, and thus determine the maximum vertical thickness dimension of the workpiece or workpieces 62. This information is in turn transmitted to the two sections 42 and 44 of the inverting unit 30.

The conveyor 202 of the gauging unit 28 then moves the tray 54 onto the lower conveyor **56*a* of the first inverting section 56*a*, with the conveyor 56*a* moving the tray 54 into the appropriate transfer location. Then, as described in some detail with reference to FIGS. 12A through 12L, the workpieces 62 are transferred onto the first transfer tray 60*a* by inverting the first inverting section 42 and moved over to the right inverting section 44 where the workpieces are inverted again and placed on the second transfer tray 60*b*. Then the second transfer tray 60*b* moves the workpiece back to the first inverting section 42, at which time there is a third inverting operation so that the end result is that the workpieces 62 end up in an inverted position back on the tray 54. Then the tray 54 is moved by the conveyor 56*a* forwardly onto the conveyor 32 to move again through the painting station 20, the drying section 22 and the cooling section 24. With the painting being accomplished, the tray 54 with the pieces thereon is moved onto the conveyor 38 to the discharge location 40**.

Another advantage of the present invention is that trays 54 can be loaded with workpieces 62 and placed on the transporting conveyors (e.g., conveyors 14 and 16) so that there is an accumulation of such trays 54 on the conveyors 14 and 16. Then the person loading the trays 54 can engage in some other activity while the trays 54 are moved sequentially through the system. Further, the sliding engagement of the trays 54 with the various conveyors permits this accumulation of trays 54 on the conveyors and the timely movement through the system. Also, this provides the benefit of maintaining the trays 54 in a holding pattern if there is a malfunction in the system which temporarily halts movement of trays 54 through the system.

Since at the completion of the operation the workpieces 62 have made two passes through the painting operation, in a first position and then in a second inverted position, the painting operation can be properly accomplished. Further, the workpieces 52 remain associated with the same tray 54 throughout the operation, thus enabling proper identification of the workpieces 62 by identification of the tray 54.

It is to be understood that throughout the system 10 of the present invention, additional sensing devices and control means are provided to accomplish the various functions automatically in the proper sequence. Since the implementation of such additional sensing devices and control means are in and of themselves well within the ordinary skill of the art, these will not be disclosed in detail herein. Also, it is to be understood that various modifications would be made without departing from the basic teachings of the present invention.

What is claimed is:

1. A method of performing an operation on an object, said method comprising:

a. locating said object on a carrying tray means in a first position with a first orientation and performing a first processing step on said object;

b. locating a first transfer tray means against said object so as to hold said object against said carrying tray means;

c. inverting said carrying tray means and said first transfer tray means so that said object rests on said first transfer tray means;

d. moving said first transfer tray means relative to said carrying tray means;

e. locating a second transfer tray means against said object so as to hold said object against said first transfer tray means;

f. inverting said first and second transfer tray means so that said object rests on said second transfer tray means;

g. moving said second transfer tray means relative to said first transfer tray means;

h. locating said carrying tray means against said object so as to hold said object against said second transfer tray means;

i. inverting said carrying tray means and said second transfer tray means so that said object rests on said carrying tray means in a second inverted position and then performing a second processing step on said object.

2. The method as recited in claim 1, wherein with said first transfer tray means engaging said object to hold said object against said carrying tray means, said first transfer tray means and said carrying tray means are inverted at a first inverting location, after which said first transfer tray means is moved to a second inverting location where said second transfer tray means engages said object and said first and second transfer tray means are inverted.

3. The method as recited in claim 2, wherein after said object is transferred onto said second transfer tray means by inversion of said first and second transfer tray means at said second inverting location, said second transfer tray means is moved to said first inverting location, where said second transfer tray means and said carrying tray means are inverted to locate said object on said carrying tray means.

4. The method as recited in claim 3, wherein said carrying tray means with said object thereon is moved by first inverting conveyor means in a longitudinal direction to said first inverting location, and after inverting said carrying tray means and said first transfer tray means, said first transfer tray means is moved by second inverting conveyor means in a transverse direction to said second inverting location.

5. The method as recited in claim 4, wherein said second transfer tray means is moved by third inverting conveyor means back to said first inverting location where said carrying tray means and said second transfer tray means are inverted, and said carrying tray means is moved by said first inverting conveyor means longitudinally from said first inverting location.

6. The method as recited in claim 2, wherein said second transfer tray means is moved by inverting conveyor means back to said first inverting location where said carrying tray mean and said second transfer tray means are inverted, and said carrying tray means is moved by other inverting conveyor means longitudinally from said first inverting location.

7. The method as recited in claim 1, wherein prior to locating said first transfer tray means against said object, said carrying tray means with said object thereon is located at a gauging location, a depth gauging means is located adjacent to said object to ascertain a depth dimension of said object relative to said carrying tray means, and said first and second transfer tray means and said carrying tray means are subsequently located at an appropriate depth location relative to said object in accordance with the depth dimension as ascertained by said depth gauging means.

8. The method as recited in claim 7, wherein said gauging means comprises a depth of gauging plate means which is moved downwardly into contact with said object to ascertain said depth dimension.

9. The method as recited in claim 8, wherein said depth gauging plate means is carried by a gauging frame means, and said carrying tray means and said gauging frame means are moved relatively toward one another to cause said gauging plate means to come into contact with said object to cause limited relative movement between said gauging plate means and said gauging frame means, with said relative movement being ascertained to in turn ascertain the depth dimension of the object.

10. The method as recited in claim 9, wherein there is provided rotatable gauging screw drive means in operative working engagement between said carrying tray means and said gauging frame means, and relative movement of said gauging tray means and said carrying tray means toward one another is accomplished by rotation of said gauging screw drive means, with the depth dimension being ascertained by ascertaining amount of rotation of the gauging screw drive means.

11. The method as recited in claim 10, wherein inverting screw drive means is provided to locate said first and second transfer tray means against said object, with rotation of said inverting screw drive means being in response to the amount of rotation of said gauging screw drive means in a manner that movement of at least the first and second transfer tray means against said object is controlled in response to amount of rotation of said gauging screw drive means.

12. The method as recited in claim 1, wherein said carrying tray means is moved from a first process location to a second process location by:

(a) moving said carrying tray means by means of a first transporting conveyor means in a first conveying direction to a transfer location;
(b) utilizing a conveyor transfer means located at said transfer location to support said carrying tray means at a first elevation at said transfer location, and moving said conveyor transfer means vertically to a second elevation to bring said carrying tray means to a position for engagement with a second transporting conveyor means;
(c) operating said second transporting conveyor means to move said carrying tray means from said transfer location in a second conveying direction transverse to said first conveying direction; and,
(d) said method being further characterized in that said conveyor transfer means is utilized to move said carrying tray means generally horizontally relative to said transfer location.

13. The method as recited in claim 12, wherein said conveyor transfer means comprises a transfer conveyor having a conveying motion aligned along said first conveying direction, said method further comprising lowering said carrying transfer means after said carrying tray means is located at said transfer location to cause said conveying tray means to be positioned on a first end of said second transporting conveyor means.

14. The method as recited in claim 13, wherein said carrying tray means has an angular orientation relative to said first and second conveying direction, and said carrying tray means maintains said angular orientation during movement of said transfer location and from said transfer location.

15. The method as recited in claim 14, wherein said second transporting conveyor means comprises laterally spaced first and second conveying chain means adapted to engage first and second edge portions of said carrying tray means, and said conveyor transfer means is located between said first and second conveying chain means, said method further comprising initially positioning a carrying tray supporting portion of said conveyor transfer means at an elevation above said first and second conveying chain means to receive said carrying tray means, and then lowering said conveyor transfer means in a manner that the supporting portion of said transfer conveyor means is positioned below a supporting portion of said first and second conveyor chain means to cause said carrying tray means to be positioned on, and supported by, said first and second conveying chain means.

16. The method as recited in claim 12, wherein said conveyor transfer means comprises a transfer conveyor having a conveying motion aligned with said second conveying direction, said method further comprising raising said conveyor transfer means after said carrying tray means is located at said transfer location to cause said carrying tray means to be positioned at said second elevation, where said carrying tray means is transferred from said conveyor transfer means to said second transporting conveyor.

17. The method as recited in claim 16, wherein said carrying tray means has an angular orientation relative to said first and second conveying directions, and said carrying tray means maintains said angular orientation during movement to said transfer location and from said transfer location.

18. The method as recited in claim 17, wherein said first transport conveyor means comprises laterally spaced first and second conveying chain means adapted to engage first and second edge portions of said carrying tray means, and said conveyor transfer means is located between said first and second conveying chain means, said method further comprising initially positioning a carrying tray supporting portion of said conveyor transfer means at an elevation below said first and second conveying chain means so that said carrying tray means can be moved to said transfer location, and then raising said conveyor transfer means in a manner that the supporting portion of the transfer conveyor means engages said carrying tray means to lift said carrying tray means to said second elevation.

19. The method as recited in claim 12, wherein at least one of said first and second transporting conveyor means comprises laterally spaced conveying chain means, and said carrying tray means is formed with downwardly facing open channel means to receive said first and second conveying chain means, said method comprising operating said first and second conveying chain means to carry said carrying tray means with said first and second conveying chain means engaging said channel means so as to properly align and engage said carrying tray means.

20. A system to perform a surface operation on an object, said system comprising:

(a) a transporting conveying apparatus to move a carrying tray means between process locations, where said carrying tray means is adapted to carry thereon an object which is to have a surface operation performed thereon;

(b) a first inverting section comprising:

(1) a first lower support frame means positioned to receive thereon from said transporting conveying apparatus said carrying tray means at a first inverting location;

(2) a first upper support frame means adapted to carry a first transfer tray means at said first inverting location;

(3) a first vertical actuating means operatively connected between said first lower and upper support frame means to move at least one of said first lower and upper support frame means in relative motion toward and away from one another so that said object is engaged between said carrying tray means and said first transfer tray means; and (4) a first rotatable actuating means operatively connected to said first lower and upper support frame means and arranged to cause rotation of said first lower and upper support frame means to invert said first upper and lower frame means and thus invert said carrying tray means and said first transfer tray means with said object engaged therebetween;

c. a second inverting section comprising:

(1) a second lower support frame means positioned to receive thereon from said first inverting section said first transfer tray means at a second inverting location;

(2) a second upper support frame means adapted to carry a second transfer tray means at said second inverting location;

(3) second vertical actuating means operatively connected between said second lower and upper support frame means to move at least one of said second lower and upper support frame means to cause relative vertical movement toward and away from one another so that said object is engaged between said first transfer tray means and said second transfer tray means; and (4) second rotatable actuating means operatively connected to said second lower and upper frame means and arranged to cause rotation of said second lower and upper frame means to invert said second lower and upper support frame means to invert said first and second transfer tray means under circumstances where said first and second transfer tray means are engaged by said second lower and upper support frame means, respectively;

d. inverting conveying means to move said first and second transfer tray means between said first and second inverting locations, whereby said first transfer tray means can be moved from said first upper transport frame means at a lower location to said second lower transport frame means at a lower location, and said second transfer tray means can be moved from said second upper support frame means at a lower location to said first upper support frame means at a lower location, whereby an object initially on said carrying tray means can be moved between said first and second inverting locations and deposited from said second inverting location to said first inverting location to come to rest on said carrying tray means in an inverted position.

21. The system as recited in claim 20, wherein said inverting conveying means comprises a first lower inverting conveyor positioned adjacent to said first inverting location and arranged to move said carrying tray means in a longitudinal direction to said first inverting location and a first upper inverting conveyor at said first inverting location adjacent said first upper transfer frame means and arranged to convey said first transfer tray means along a transverse axis laterally from said longitudinal axis to said second inverting location.

22. The system as recited in claim 21, wherein said inverting conveying means, comprises a second upper conveyor positioned adjacent to said second upper support frame means and arranged to move said second transfer tray means along said transverse axis from said second inverting location to said first inverting location.

23. The system as recited in claim 22, wherein said inverting conveying means comprises a second lower conveyor arranged to move said first transfer tray means along said transverse axis from said second inverting location to said first inverting location.

24. The system as recited in claim 23, wherein said first rotatable actuating means comprises a first main frame mounted for rotation about a transverse horizontal axis, and said first upper and lower support frame means are mounted to said first main frame, with at least one of said first upper and lower support frame means being vertically movable relative to said first main frame.

25. The system as recited in claim 24, further comprising inverting screw drive means mounted to said first main frame and operatively connected to at least one of said first upper and lower support frame means, in a manner that rotation of said inverting screw drive means causes vertical movement of at least one of said first upper and lower support frame means relative to said first main frame.

26. The system as recited in claim 25, wherein said inverting screw drive means is operatively connected to both of said first lower and upper support frame means to cause motion of both of said first lower and upper support frame means relative to said first main frame.

27. The system as recited in claim 20, wherein said first rotatable actuating means comprises a first main frame mounted for rotation about a transverse horizontal axis, and said first lower and upper support frame means are mounted to said first main frame, with at least one of said upper and lower support frames being vertically movable relative to said first main frame.

28. The system as recited in claim 27, further comprising first inverting screw drive means mounted to said first main frame and operatively connected to at least one of said first upper and lower support frame means in a manner that rotation of said first inverting screw drive means causes vertical movement of at least one of said first upper and lower support frame means relative to said first main frame.

29. The system as recited in claim 28, wherein said first inverting screw drive means is operatively connected to both of said first lower and upper support frame means to cause motion of both of said first lower and upper support frame means relative to said first main frame.

30. The system as recited in claim 27, wherein said second rotatable actuating means comprises a second main frame mounted for rotation about a transverse horizontal axis, and said second upper and lower support frame means are mounted to said second main frame, with at least one of said upper and lower support frames being vertically movable relative to said second main frame.

31. The system as recited in claim 30, further comprising second inverting screw drive means mounted to said second main frame and operatively connected to at least one of said second upper and lower support frame means, in a manner that rotation of said second inverting screw drive means causes vertical movement of at least one of said second upper and lower support frame means relative to said second main frame.

32. The system as recited in claim 31, wherein said second inverting screw drive means is operatively connected to both of said second lower and upper support frame means to cause motion of both of said second lower and upper support frame means relative to said first main frame.

33. The system as recited in claim 20, wherein said system further comprises a gauging apparatus comprising:

a. gauging conveyor and support means adapted to move said carrying tray means with said object thereon to a gauging location and to support said carrying tray means at said gauging location;
b. gauging frame means mounted so as to be vertically movable toward and away from said gauging conveying and support means at said gauging location;
c. gauging plate means mounted to said gauging frame means and arranged to come into gauging engagement with said object so as to ascertain a depth dimension of said object on said carrying tray means; and
d. control means operatively connected between said gauging apparatus and said first and second inverting sections to control said first and second vertical actuating means in accordance with the depth dimension of said object as ascertained by said gauging apparatus.

34. The system as recited in claim 33, wherein said gauging plate means is mounted to said gauging frame means for limited relative movement with respect to said gauging frame means, said gauging apparatus further comprising sensing means to sense the relative movement between the gauging plate means and the gauging frame means in response to contact with said object.

35. The system as recited in claim 34, wherein said gauging apparatus further comprises rotatable gauging screw drive means which is in operative engagement between said gauging conveyor and support means and said gauging frame means in a manner that rotation of said gauging screw drive means causes relative movement of said gauging frame means with respect to said gauging conveying and support means, said control means being responsive to amount of rotation of the gauging screw drive means to ascertain said depth dimension.

36. The system as recited in claim 35, further comprising first inverting screw drive means mounted to said first main frame and operatively connected to at least one of said first upper and lower support frame means, in a manner that rotation of said inverting screw drive means causes vertical movement of at least one of said first upper and lower support frame means relative to said first main frame.

37. The system as recited in claim 36, wherein said inverting screw drive means is operatively connected to both of said first lower and upper support frame means to cause motion of both of said first lower and upper support frame means relative to said first main frame.

38. The system as recited in claim 20, wherein said transporting conveying apparatus comprises:

a. a first transporting conveyor arranged to convey said carrying tray means along a first conveying path aligned with a transfer location;
b. a second transporting conveyor positioned adjacent to said transfer location and arranged to convey said carrying tray means along a second conveying path aligned with said transfer location and transverse to said first conveying path;
c. a conveyor transfer means located at said transfer location and having a conveying and support device adapted to receive said carrying tray means from one of said first and second transporting conveyors; and
d. said conveying and support device being vertically movable relative to said first and second transporting conveyor mean, between an upper position where the conveying and support device has a support portion aligned with said first transporting conveyor and a lower position where said support portion is below a support portion of said second transporting conveyor;

whereby when the carrying tray means is being moved from said first transporting conveyor to said second transporting conveyor, said conveying and support device means can be positioned at said upper position to receive the carrying tray means from the first transporting conveyor and lowered to deposit the tray on the second transporting conveyor, and under circumstances where said carrying tray means is to be moved from said second transporting conveyor to said first transporting conveyor, said conveying and support device can be moved upwardly to move said carrying tray means upwardly from said second transporting conveyor to a level of said first transporting conveyor so that said carrying tray means can then be moved onto said first transporting conveyor.

* * * * *